US006665381B1

United States Patent
Nassimi

(12) United States Patent
(10) Patent No.: US 6,665,381 B1
(45) Date of Patent: Dec. 16, 2003

(54) SELF-CONTAINED DEVICE USING A SINGLE PHONE LINE TO RECEIVE PHONE CALLS AND FACSIMILES WHILE CONNECTABLE TO THE INTERNET

(76) Inventor: Shary Nassimi, 5913-C 127th Ave., Suite 800, Vancouver, WA (US) 98682

( * ) Notice: Subject to any disclaimer, the term of this patent is extended or adjusted under 35 U.S.C. 154(b) by 0 days.

(21) Appl. No.: 10/084,730

(22) Filed: Feb. 26, 2002

(51) Int. Cl.[7] .............................................. H04M 11/00
(52) U.S. Cl. ................................ 379/93.11; 379/93.35; 379/142.08; 379/142.07
(58) Field of Search ........................... 379/93.11, 93.09, 379/93.05–93.07, 93.35, 142.01, 142.07, 142.08, 142.13

(56) References Cited

U.S. PATENT DOCUMENTS

| | | | |
|---|---|---|---|
| 4,446,338 A | 5/1984 | Rosch | |
| 4,639,553 A | 1/1987 | Kiguchi | |
| 4,742,538 A | 5/1988 | Szlam | |
| 4,856,049 A | 8/1989 | Streck | |
| 5,003,581 A | 3/1991 | Pittard | |
| 5,036,534 A | 7/1991 | Gural | |
| 5,056,132 A * | 10/1991 | Coleman et al. | 379/93.11 |
| 5,062,133 A * | 10/1991 | Melrose | 379/93.11 |
| 5,392,334 A | 2/1995 | O'Mahoney | |
| 5,519,767 A | 5/1996 | O'Horo et al. | |
| 5,809,128 A | 9/1998 | McMullin | |
| 6,005,924 A | 12/1999 | Krexner et al. | |
| 6,067,353 A | 5/2000 | Szeliga | |
| 6,078,581 A | 6/2000 | Shtivelman et al. | |
| 6,259,353 B1 | 7/2001 | Berger et al. | |
| 6,259,692 B1 | 7/2001 | Shtivelman et al. | |
| 6,317,488 B1 * | 11/2001 | DePond et al. | 379/93.35 |
| 6,377,668 B1 * | 4/2002 | Smock et al. | 379/142.08 |

* cited by examiner

Primary Examiner—Wing F. Chan
(74) Attorney, Agent, or Firm—Richard L. Miller

(57) ABSTRACT

A self-contained device using a single telephone line to receive telephone calls and facsimilies while being simultaneously connectable to the Internet, which provides an all-in-one solution for multiple devices present and operating on a single standard telephone line. The benefits include the ability to receive calls and faxes, whether online or not online and to remain online if already on line. Additionally, the present invention switches between voice and fax calls, automatically and without any intervention from the user. To achieve the combined functions, the present invention integrates a micro-processor which coordinates general functionality. Tone detection circuitry, which provides extremely narrow and selective detection range and detects the appropriate tones. Care is taken to assure a narrow enough detector design which will not false alarm or detect such sound as modem noise, which includes a fax tone and a call waiting tone.

16 Claims, 33 Drawing Sheets

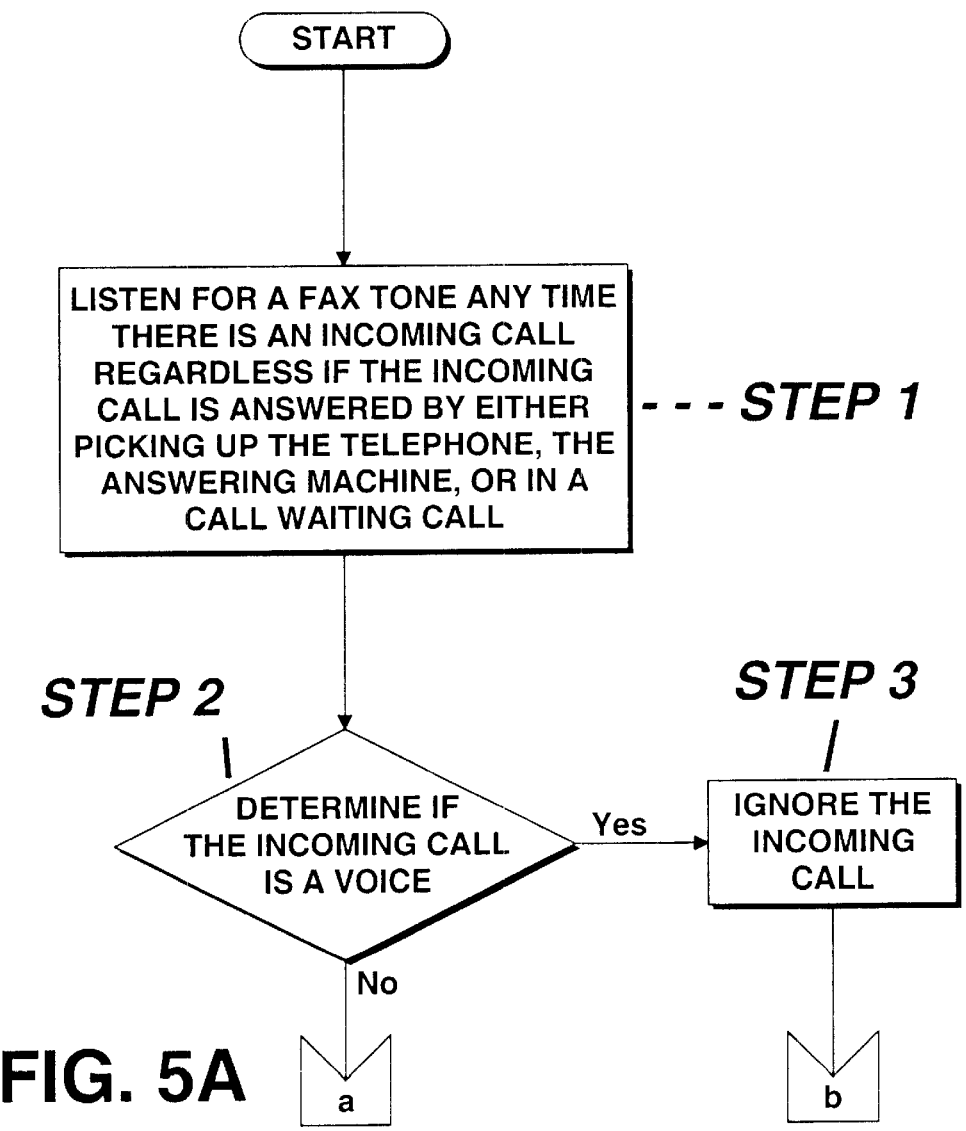

METHOD OF OPERATION OF THE SELF-CONTAINED DEVICE (10) WHEN USED WITH THE FACSIMILE MACHINE (16)

METHOD OF ASCERTAINING THAT CALLING WAITING IS NOT DISABLED FOR AOL USERS

METHOD OF MAKING THE SELF-CONTAINED DEVICE (10) WORK BETTER WITH THE COMPUTER (18) IF THE COMPUTER (18) DISCONNECTS AS SOON AS THE TELEPHONE/ANSWERING MACHINE (14) RINGS OR AS SOON AS THE TELEPHONE/ANSWERING MACHINE (14) IS ANSWERED

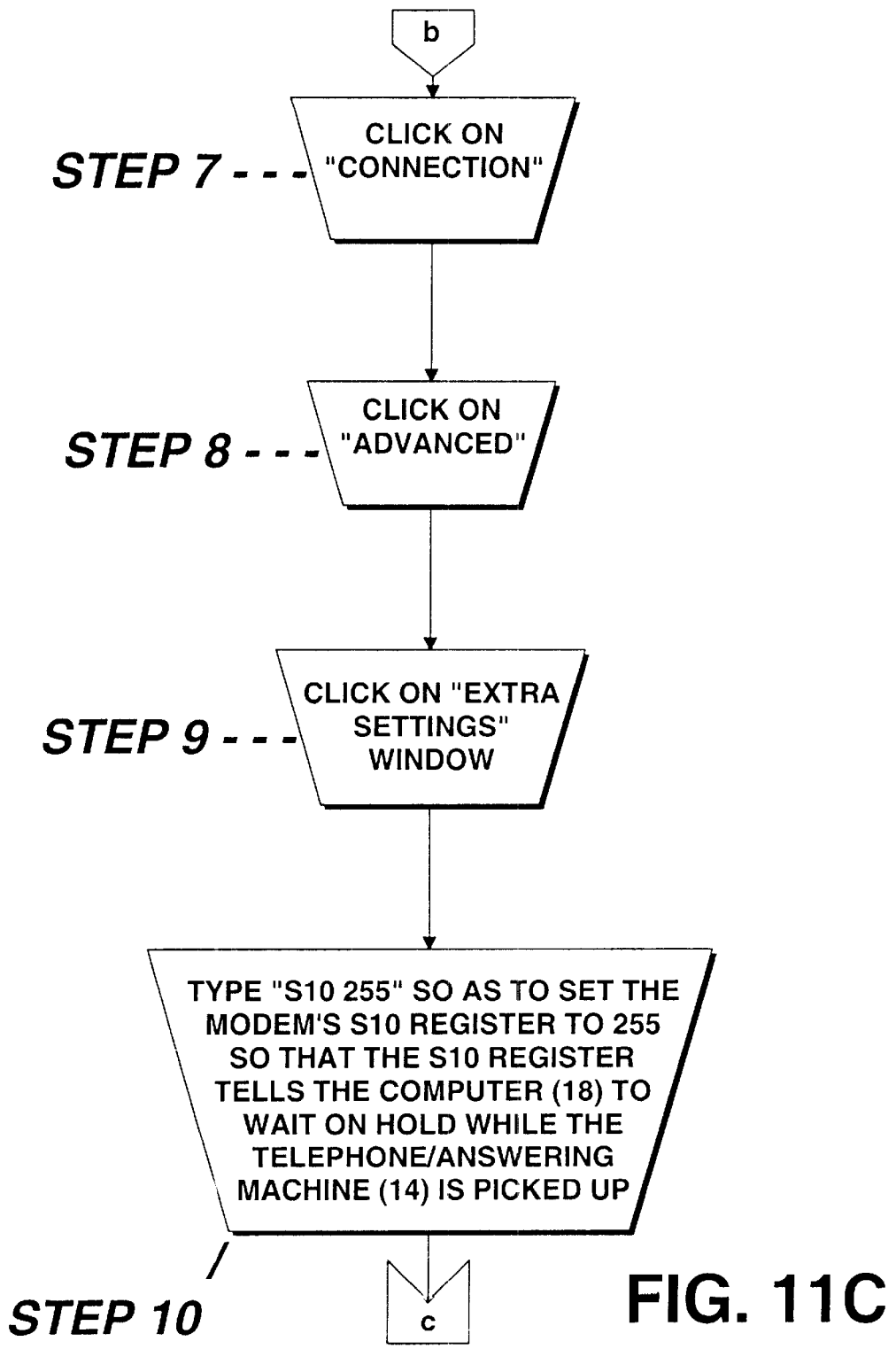

SELF-CONTAINED DEVICE USING A SINGLE PHONE LINE TO RECEIVE PHONE CALLS AND FACSIMILES WHILE CONNECTABLE TO THE INTERNET

BACKGROUND OF THE INVENTION

1. Field of the Invention

The present invention relates to a self-contained device for using a single telephone line to receive telephone calls and facsimiles. More particularly, the present invention relates to a self-contained device for using a single telephone line to receive telephone calls and facsimiles while being simultaneously connectable to the Internet.

2. Description of the Prior Art

Numerous innovations for telecommunication devices have been provided in the prior art that will be described. Even though these innovations may be suitable for the specific individual purposes to which they address, however, they differ from the present invention.

A FIRST EXAMPLE, U.S. Pat. No. 4,639,553 to Kiguchi teaches a facsimile communication system wherein a call signal detecting device is for identifying call signals which are received over a network. Both an unsounding call signal and a sounding call signal are detected by a single detection circuitry, which is also responsive to off-hooking of an own station's telephone set. Detection of such signals is implemented by the measurement of a period which is performed by a processing unit, so that changes in the specifications of the signals to be detected can be accommodated merely by modifying a program of the processing system and not the hardware of the device.

A SECOND EXAMPLE, U.S. Pat. No. 4,856,049 to Streck teaches apparatus for answering an incoming call over a single telephone line and for automatically switching the call between a telephone and a carrier signal-based device as appropriate. There is a three position switch for switching a telephone line connected thereto between first, second and third output positions thereof. The switch has the telephone operably connected to the second output position thereof and the carrier signal-based device connected to the third output position thereof. There is first logic having an input connected to the first output position of the switch and an output operably connected to switch the switch between the first, second and third output positions for answering an incoming call on the telephone line, for determining whether the incoming call is from a carrier signal-based device, for switching the switch to connect the second output position when an incoming call from a non-carrier signal-based device is detected, and for switching the switch to connect the third output position when an incoming call from a carrier signal-based device is detected. There is also second logic having an input connected to sense transmissions from the telephone and the carrier signal-based device and an output operably connected to switch the switch between the first, second and third output positions for switching the switch to the first position when a hang up by the telephone or the carrier signal-based device is detected. The preferred embodiment also senses a pickup by either device and automatically switches the switch to connect the device to the telephone line for outgoing transmission use. The preferred stand-alone version also includes telephone answering capability for alerting a caller to its operation and for recording a message if the telephone is not answered.

A THIRD EXAMPLE, U.S. Pat. No. 5,003,581 to Pittard teaches a control and switching unit used with at least two devices for transmitting information or voice communication over telephone lines. The control and switching unit is provided with a series of relay to ensure that only one of the devices receives or transmits information at any one time. A timing circuit is utilized such that if one of the devices is a telephone, the second device would not be able to gain access to the telephone line if the telephone is ringing. Additionally, if the telephone is in use, the secondary device, such as a modem, could be selected and this secondary device would gain access to the telephone line after the use of the telephone has been discontinued.

A FOURTH EXAMPLE, U.S. Pat. No. 5,036,534 to Gural teaches a subscriber's interface enabling the connection of otherwise incompatible telephone device systems (hereinafter "(Z)") to a single telephone line, each telephone device system having devices such as: a computer modem (hereinafter "(F)"), an automatic answering machine (hereinafter "(A)"), and telephone sets (hereinafter "(T)"). When a ring signal is received from the central office, the interface allows a first device, such as (A) or (T) to answer the call, and monitors the communication between the calling party and the first device bearing in mind its various operating modes. Based on the monitored conversation, the interface determines if the call should be connected to a second device. If so, an actuating signal is sent to (F), whereupon when (F) becomes OFF HOOK, it is connected to the telephone line. If the first device is an automatic answering machine, its various operating modes include: outgoing message, incoming message, beeperless remote mode. If the first device is a remotely located telephone set, its various mode of operation include simple human voice signals and complex human voice signals.

A FIFTH EXAMPLE, U.S. Pat. No. 5,392,334 to O'Mahoney teaches a method for processing an incoming call on a telephone line in a computer system, wherein a telephony circuit detects a pick-up by a parallel device coupled to the telephone line while maintaining high voltage isolation. The telephony circuit performs hard line seizures to cause the parallel device to hang-up and soft line seizures to prevent a central office hang up after the parallel device hangs up.

A SIXTH EXAMPLE, U.S. Pat. No. 5,519,767 to O'Horo et al. teaches a call-waiting feature that is supported on voice-and-data modems by causing voice-and-data modems to go into voice-only mode upon receipt of the modem clear-down signal. A first voice-and-data modem engaged in an initial voice-and-data call with a second voice-and-data modem responds to receipt of a call-waiting signal by generating a replica of the call-waiting signal on the user's audio channel. The first modem responds to a user request to pick up the waiting call by sending the modem clear-down signal to the second voice-and-data modem, going into voice-only mode, and transmitting a waiting-call acceptance signal. The initial call that is placed on hold is thus a voice-only call. While in a voice-plus-data picked-up waiting call, the first modem responds to a user request to reinstate the initial call by again sending the modem clear-down signal, going into voice-only mode, and transmitting a call-resumption signal. The first modem is thus in voice-only-mode when it is reconnected to the initial, voice-only, call. The reconnected initial call may now be reconverted into a voice-plus-data call in the convention manner.

A SEVENTH EXAMPLE, U.S. Pat. No. 5,809,126 to McMullin teaches methods and apparatus for providing automatic redirection of an incoming voice telephone call from a caller to a subscriber proxy when an attempt by the caller to connect to a telephone link of a public switched telephone network (PSTN) is blocked due to the telephone link being occupied by a subscriber using the telephone link to establish communication between the subscriber's personal computer and a computer network. The subscriber proxy is connected to both the PSTN and the computer network, and produces audio interaction with the caller. The subscriber proxy also notifies the subscriber of the incoming call via the subscriber's computer. The subscriber's computer can optionally be used by the subscriber to control and interact with the incoming call by communicating with the computer proxy while the subscriber continues to occupy the telephone link.

AN EIGHTH EXAMPLE, U.S. Pat. No. 6,005,924 to Krexner et al. teaches a fax and phone combination device. The combination device is coupled to an external phone. From a phone line, the combination device receives a call signal, a fax signal, and an information signal. The call signal precedes the fax signal and the information signal. The combination device comprises a fax, an internal phone, and a call signal processor. The call processor processes the call signal received by the combination device and produces a first ringing signal from the call signal. The first ringing signal is intended for the internal phone. The combination device further comprises a ringing signal generator for generating a second ringing signal that is intended for the external phone, and a switch coupled to the fax, the internal phone, and the call processor. A call pulse in the call signal causes the switch to switch the combination device in a simulated receiving mode. In the simulated receiving mode, the fax signal detector detects whether the fax signal is present. If the fax signal is present, the fax signal is routed to the fax. If no fax signal is present, the second ringing signal is routed to the external phone.

A NINTH EXAMPLE, U.S. Pat. No. 6,067,353 to Szeliga teaches a method and related apparatus for detecting the presence of a call waiting signal on a telephone line, where the call waiting signal is embedded in various signals. The call waiting signal frequency is isolated from the various other frequencies. The isolated call waiting frequency is then biased so that only the positive voltage portions of the signal are allowed to pass. Each positive voltage pulse as well as the zero voltage pulses are then sampled to determine whether they are representative of a biased call waiting signal. Each time a determination is made, one is added to a count on an up-down counter. When the count reaches a predetermined number, a call waiting signal is detected on the telephone line. Preferably an alarm signals the presence of a detected call waiting signal to the user. A disconnect switch interrupts a modem so that a person using the modem on the same telephone line will have sufficient time to answer a detected incoming call.

A TENTH EXAMPLE, U.S. Pat. No. 6,259,353 to Berger et al. teaches a transponder communication device that interrogates an operational test transponder that is permanently within a receiving range of the transponder communication device. In response thereto, the operational test transponder sends operational test information to the transponder communication device. The transponder communication device checks whether received operational test information is valid, and generates an error signal if the received operational test information is invalid.

AN ELEVENTH EXAMPLE, U.S. Pat. No. 6,259,692 to Shtivelman et al. teaches a telephony call-waiting system for clients having a computer with a video display unit (PC/VDU) and a public-switched telephony network (PSTN) telephone connected to the PSTN by a single line, keeps a status indication of the client's internet connection status and, during periods of time the PC/VDU is connected to the internet, alerts the client by an alert signal over the internet connection of any waiting PSTN calls. In a preferred embodiment the client's PC/VDU is adapted to provide an audio and/or visual alert event when an alert signal is received, and to provide for a user-initiated response to an alert, accepting or rejecting a call. In the event a call is accepted, provision is made for connecting the accepted call to the client's PC/VDU as an IP call. In some embodiments several calls may be dealt with at the PC/VDU, and features are provided such as caller-ID on the client's VDU. Several ways of accomplishing the call-waiting system are taught.

It is apparent that numerous innovations for telecommunication devices have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a self-contained device for using a single telephone line to receive telephone calls and facsimiles while being simultaneously connectable to the Internet that avoids the disadvantages of the prior art.

ANOTHER OBJECT of the present invention is to provide a self-contained device for using a single telephone line to receive telephone calls and facsimiles while being simultaneously connectable to the Internet that is simple to use.

BRIEFLY STATED, STILL YET ANOTHER OBJECT of the present invention is to provide a self-contained device using a single telephone line to receive telephone calls and facsimiles while being simultaneously connectable to the Internet. The device includes a single housing, a facsimile jack connected to a facsimile machine, a telephone/answering machine jack connected to a telephone/answering machine, a modem jack connected to a computer, a telephone line jack connected to a telephone outlet, a microprocessor, tone detectors communicating with the microprocessor, telephone line isolation and input amplification and filtration communicating with, and between, the tone detectors and the telephone line jack, a tone select communicating with the tone detectors, display and ring buzzer communicating with the micro-processor, a ring voltage generator communicating with, and between, the display ring buzzer and the facsimile jack, a status detect (on/off hook) communicating with the micro-processor, control relays communicating with the status detect (on/off hook), and output drivers communicating with the micro-processor.

The present invention is designed to provide an all-in-one solution for multiple devices present and operating on a single standard telephone line. The benefits include the ability to receive calls and faxes, whether online or not online and to remain online if already on line. Additionally, the present invention switches between voice and fax calls, automatically and without any intervention from the user. In addition the present invention also permits the user to receive both call an faxes while not on line.

To achieve the combined functions, the present invention integrates a micro-processor which coordinates general functionality. Tone detection circuitry, which provides extremely narrow and selective detection range and detects the appropriate tones. Care is taken to assure a narrow enough detector design which will not false alarm or detect such sound as modem noise which is far stronger, louder, and full spectrum than the intended detection range, which includes a fax tone and a call waiting tone.

Additionally, other detection tones for call waiting are selectively made available for other countries. Such tones are selected by the user or manufacturer.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawing are briefly described as follows:

FIGS. 5A–5B and 6A–6G are flow charts of the method of operation of the present invention when used with a facsimile machine;

FIGS. 11A–11D is a flow chart of the method of making the present invention work better with the computer if the computer disconnects as soon as the telephone/answering machine rings or as soon as the telephone/answering machine is answered.

Figure 1:
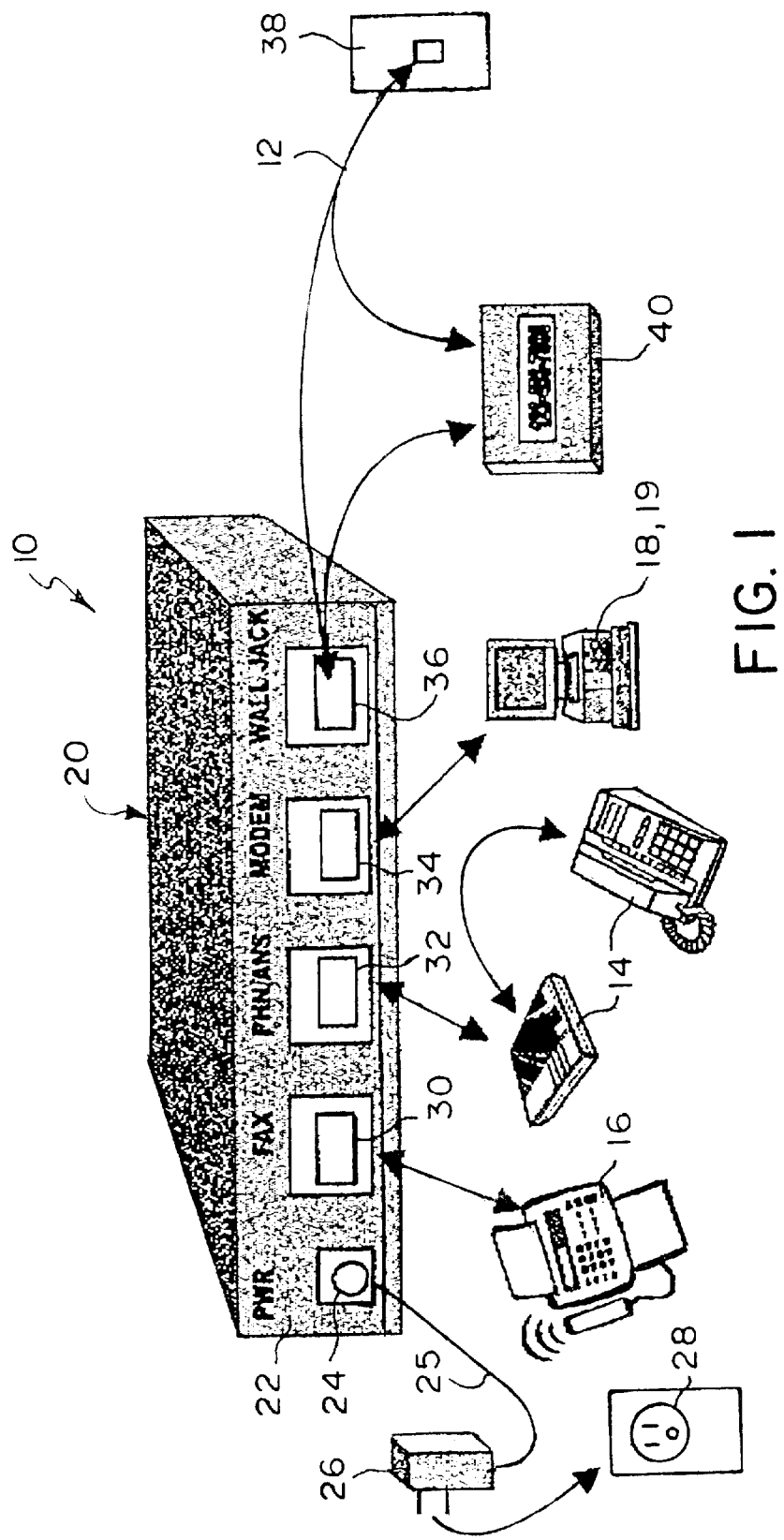
FIG. 1 is a diagrammatic perspective view of the present invention interfacing with associated inputs.

LIST OF REFERENCE NUMERALS UTILIZED IN THE DRAWING 10 self-contained device of present invention for using single telephone line 12 to receive telephone calls and facsimiles for transmission respectively to a telephone/answering machine 14 and facsimile machine 16 while being simultaneously connectable to the Internet by computer 18
12 single telephone line
14 telephone/answering machine
16 facsimile machine
18 computer
20 single housing
22 back wall of single housing 20
24 power supply input
25 cable
26 AC transformer for connecting to AC power source 28
28 AC power source
30 facsimile jack for connecting to facsimile machine 16
32 telephone/answering machine jack for connecting to telephone/answering machine 14
34 modem jack for connecting to computer 18
36 telephone line jack for connecting to telephone outlet 38
38 telephone outlet
40 caller ID device
41 power supply
42 micro-processor
43 5 volt voltage regulator of power supply 41
44 tone detectors
44a fax tone detector of tone detectors 44
44b call waiting tone detector of tone detectors 44
45 telephone line isolation and input amplification and filtration
46 tone select
48 display and ring buzzer
50 ring voltage generator
51 subminiature step-up transformer of ring voltage generator 50
52 status detect (on/off hook)
53 transistor of ring voltage generator 50
54 control relays
55 first diode of ring voltage generator 50
56 output drivers
57 second diode of ring voltage generator 50
58 operational amplifier
59 first capacitor of ring voltage generator 50
60 transistor array chip of output drivers 56
61 second capacitor of ring voltage generator 50
62 first optoisolator of control relays 54
63 resistor of ring voltage generator 50
64 second optoisolator of control relays 54
65 first control relay of control relays 54
66 third optoisolator of control relays 54
67 second control relay of control relays 54
68 fourth optoisolator of control relays 54
69 third control relay of control relays 54
71 fourth control relay of control relays 54

DETAILED DESCRIPTION OF THE PREFERRED EMBODIMENT

Figure 2:
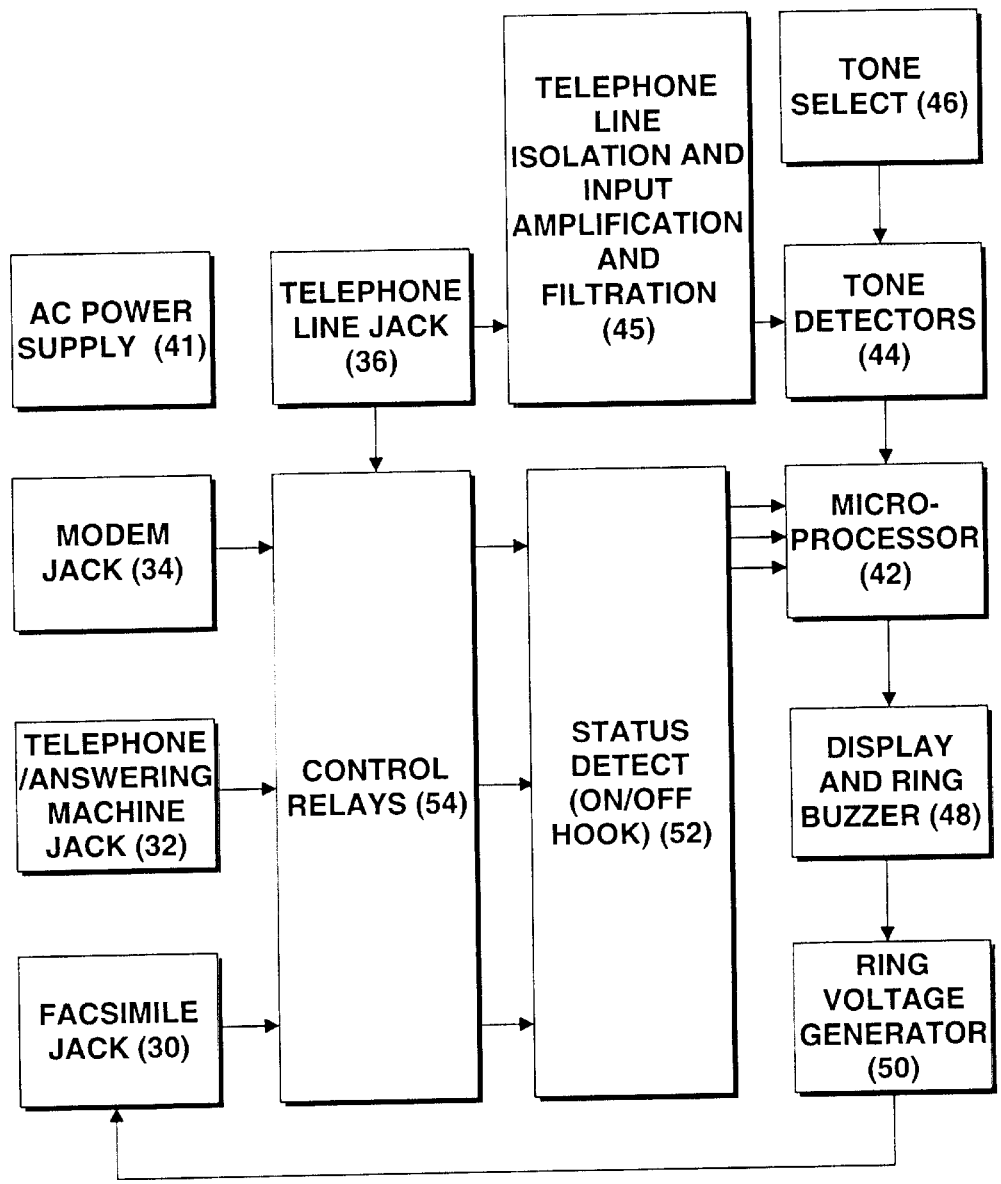
FIG. 2 is a block diagram of the present invention.
Figure 3A:
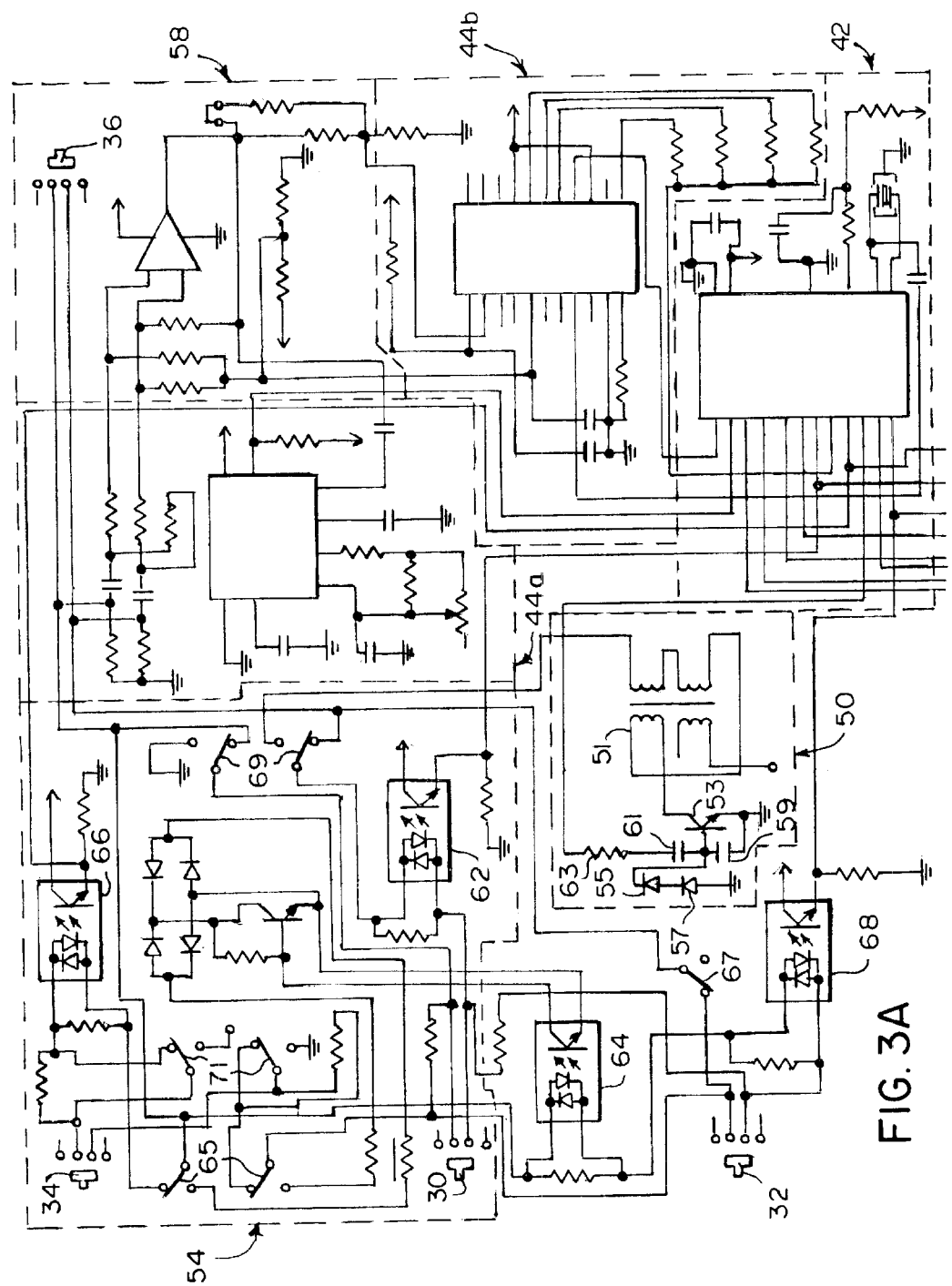
FIGS. 3A–3B is a schematic diagram of the present invention.
Figure 3B:
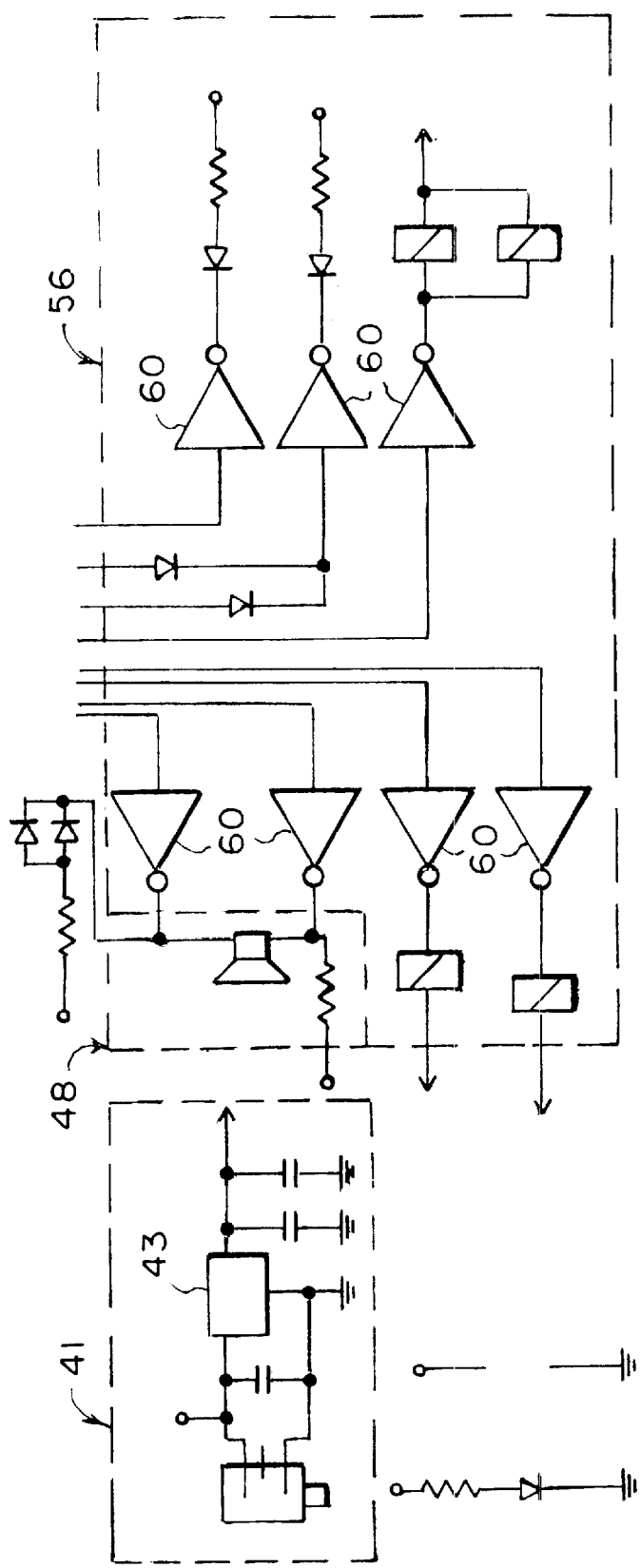
Figure 4A:
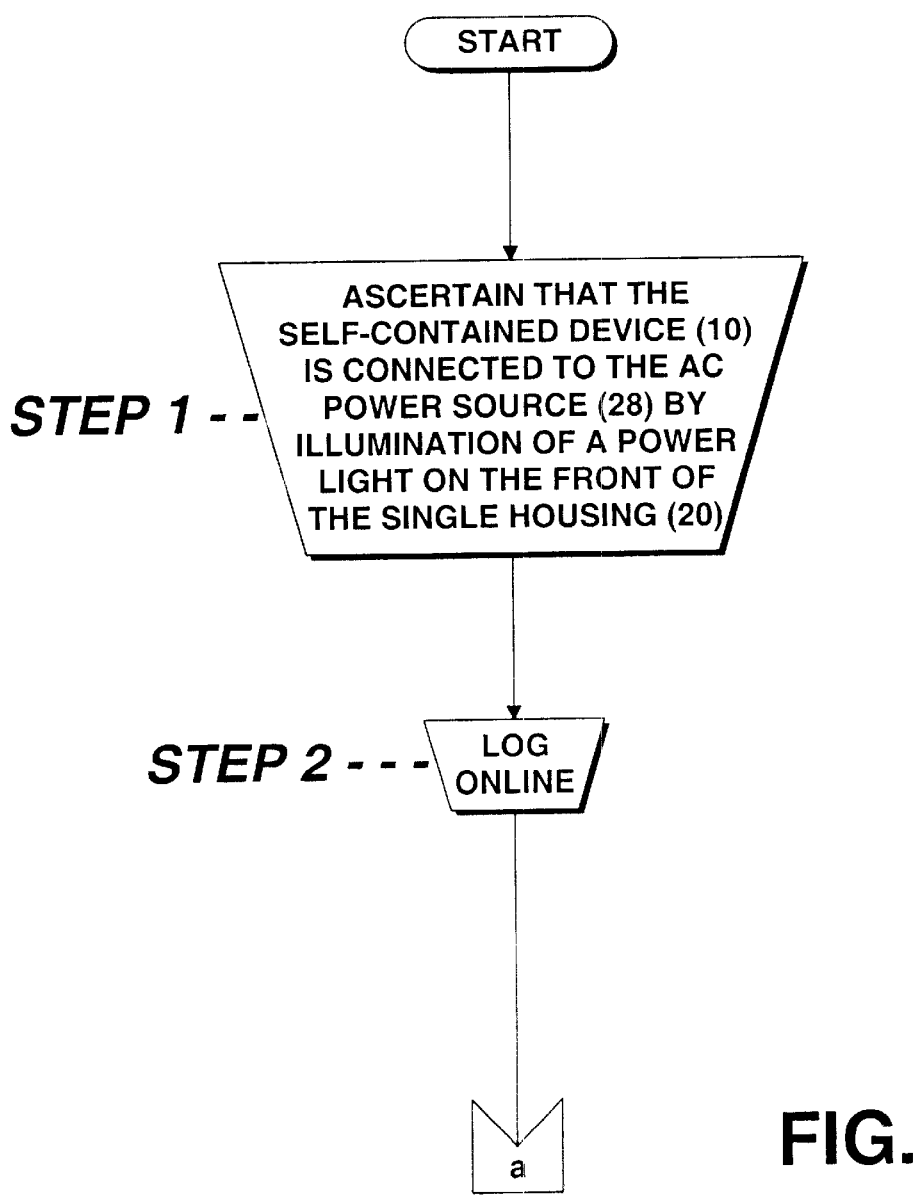
FIGS. 4A–4D is a flow chart of the method of operation of the present invention.
Figure 4B:
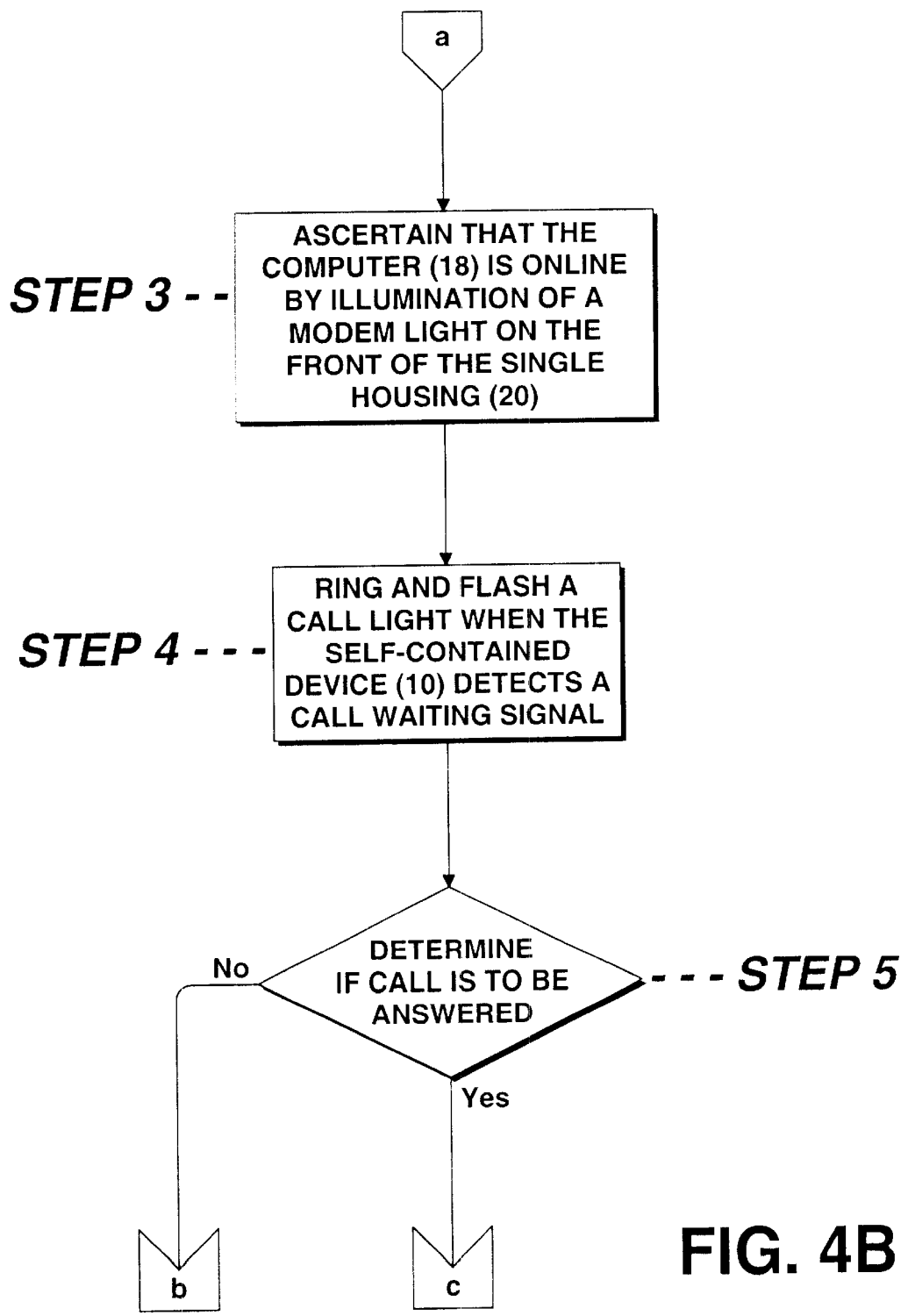
Figure 4C:
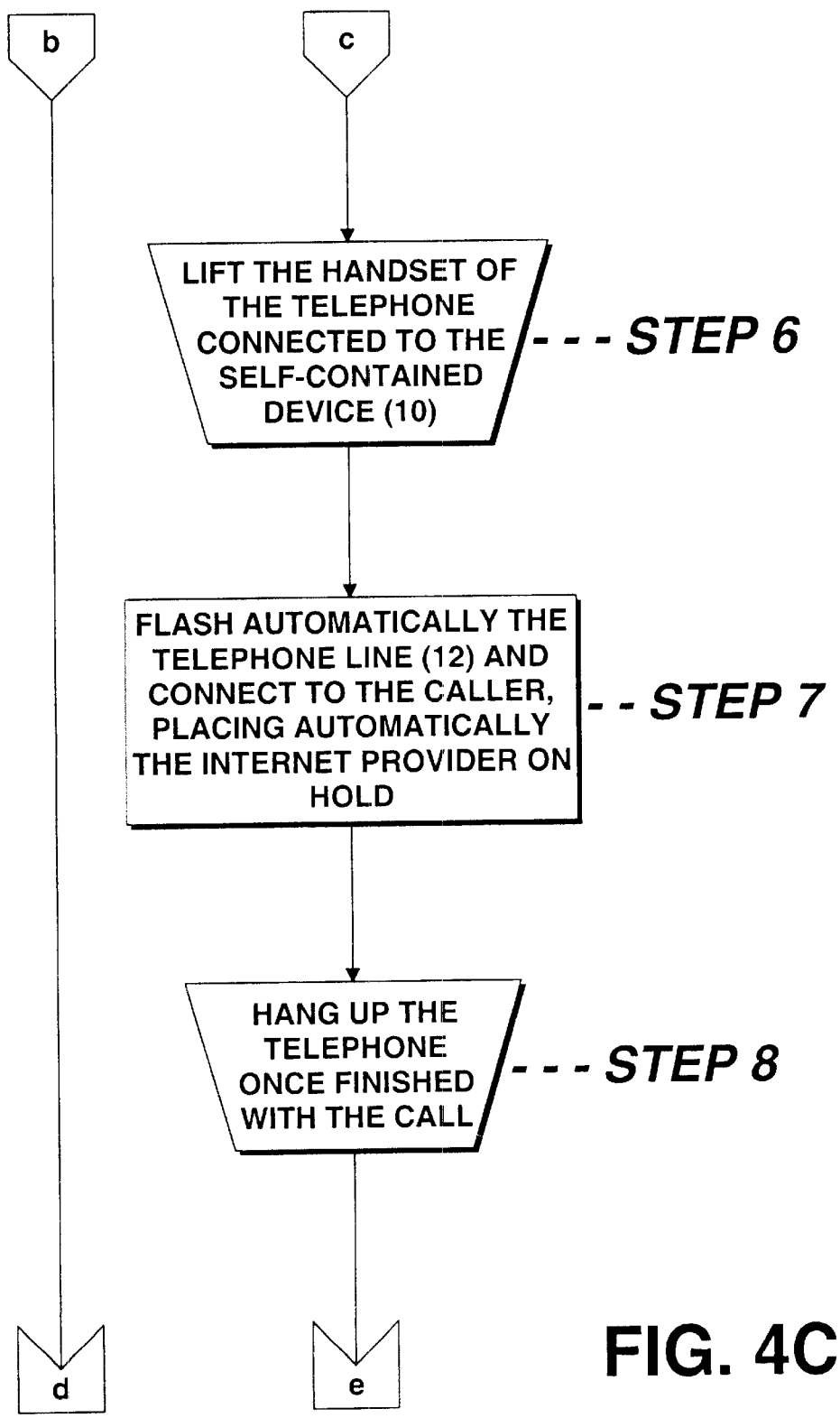
Figure 4D:
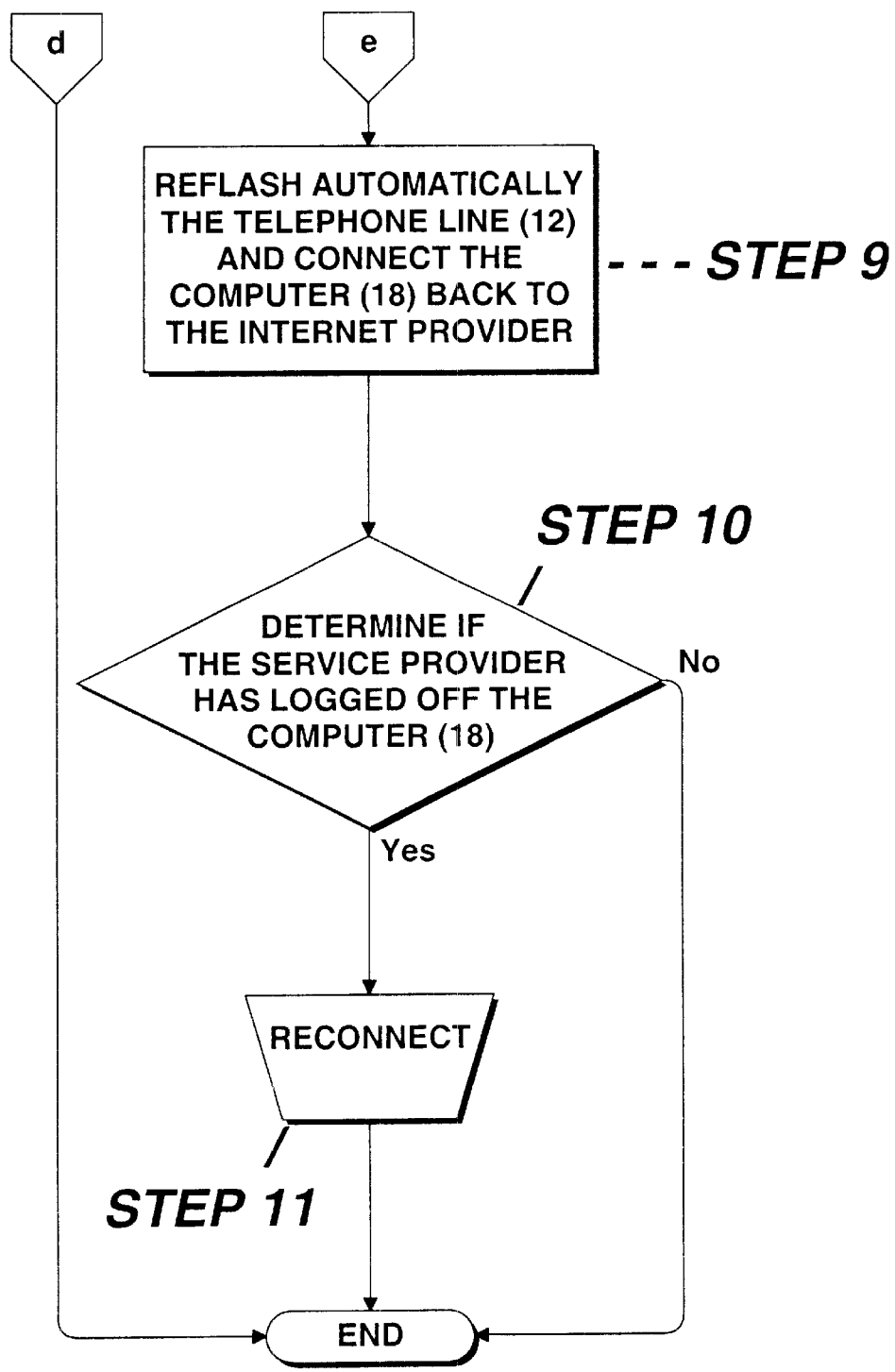
Figure 5B:
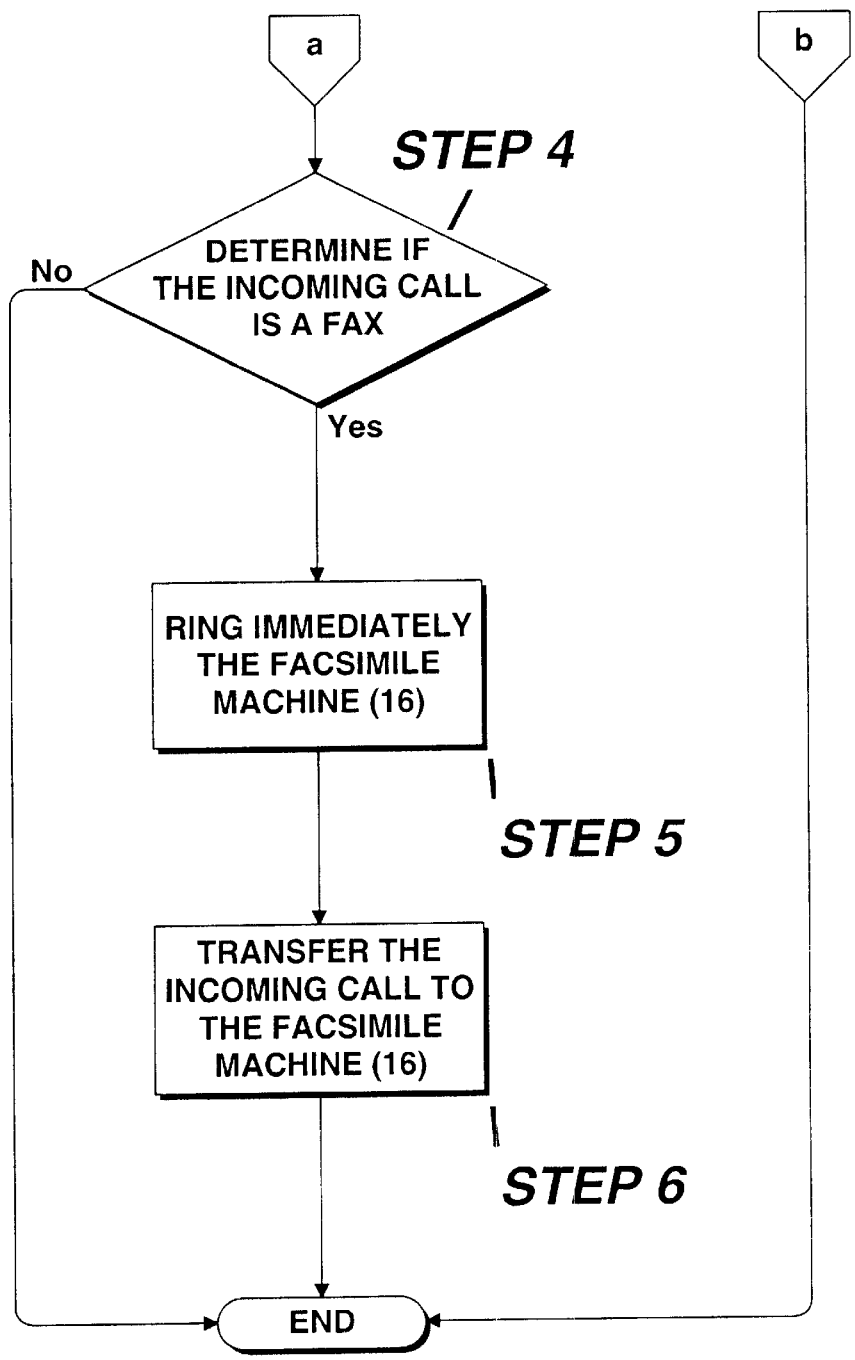
Figure 6A:
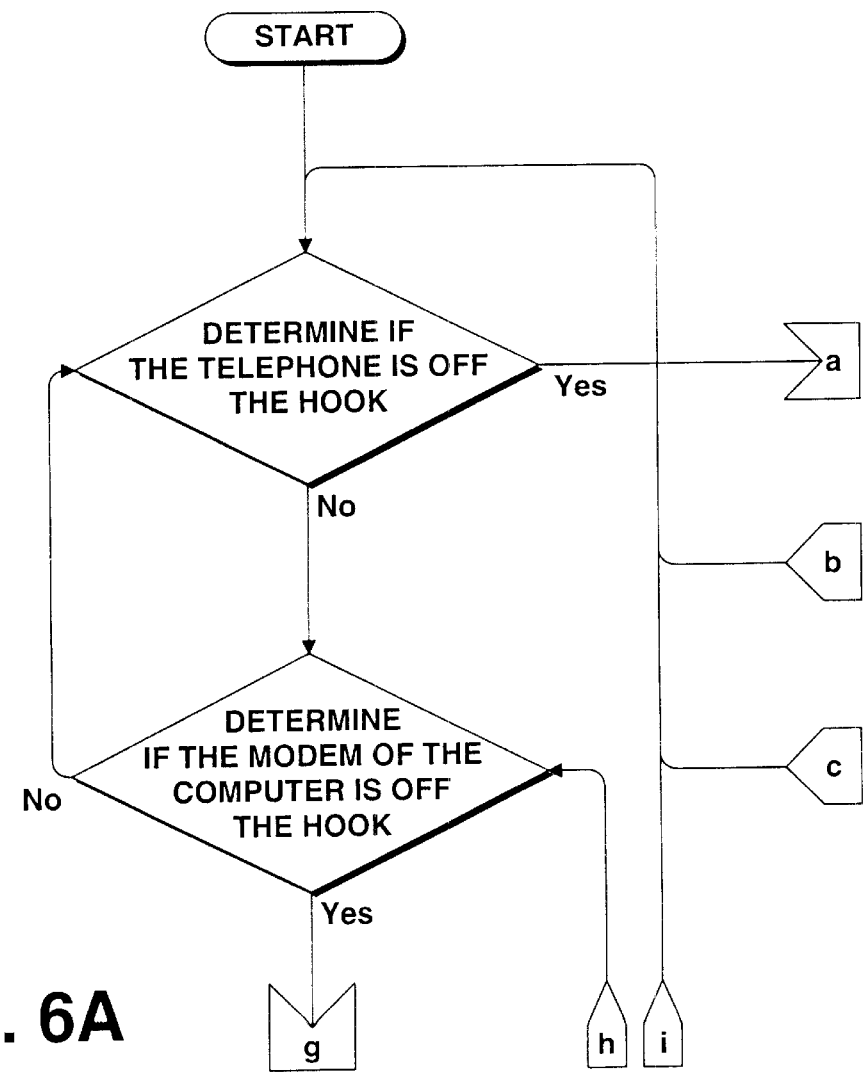
Figure 6B:
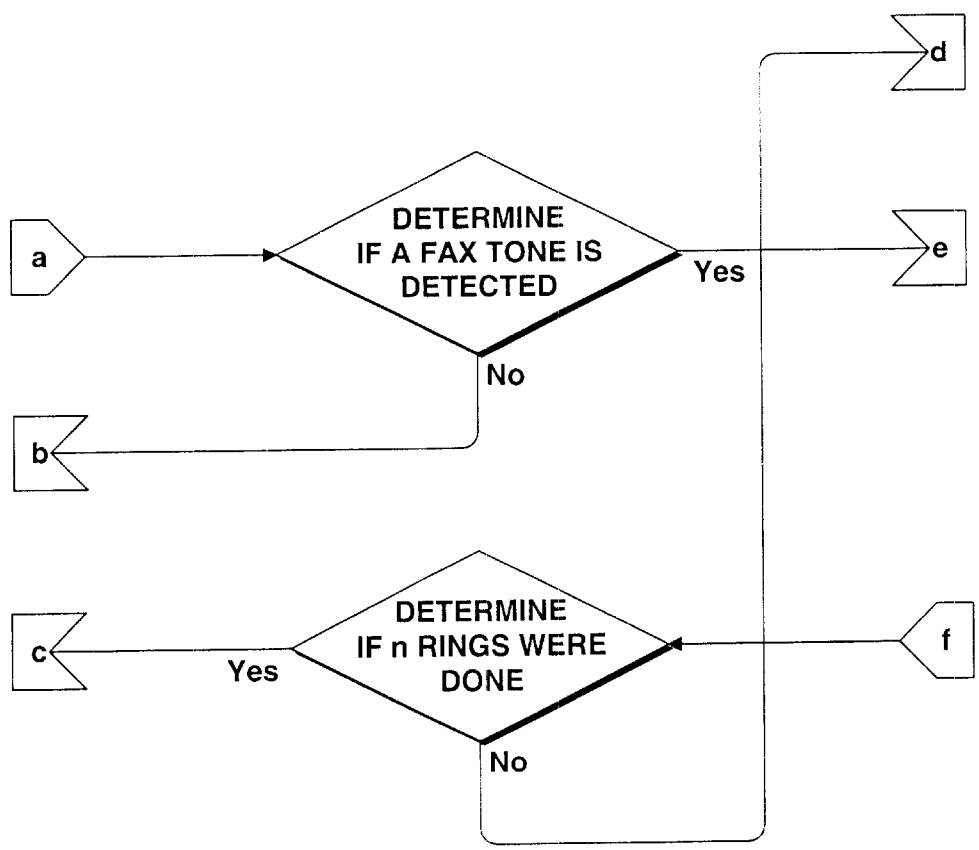
Figure 6C:
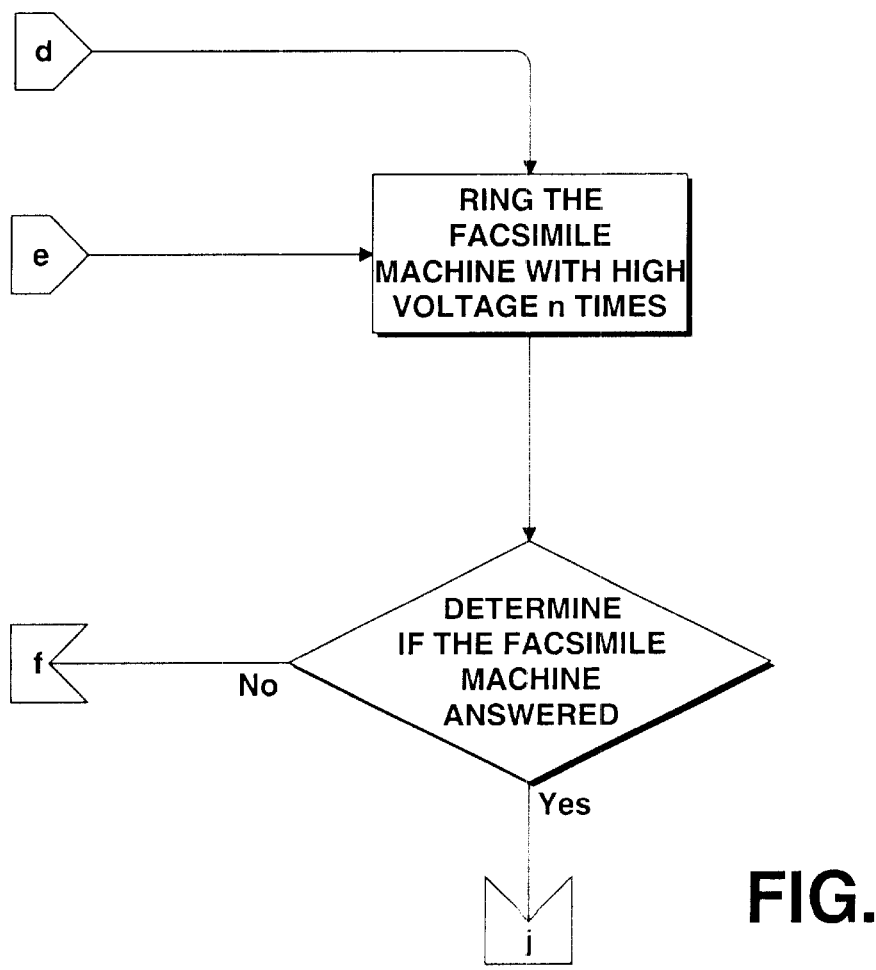
Figure 6D:
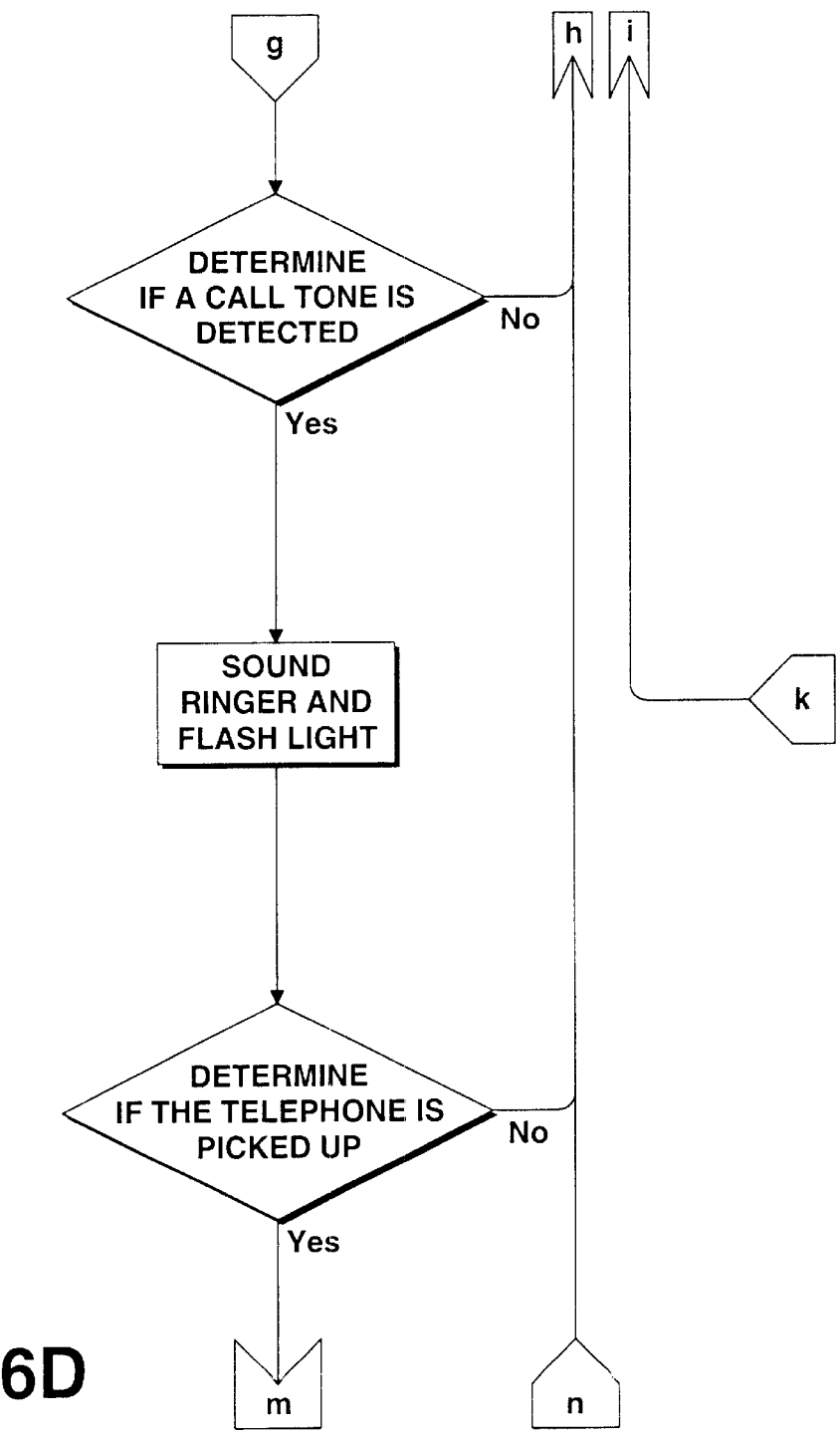
Figure 6E:
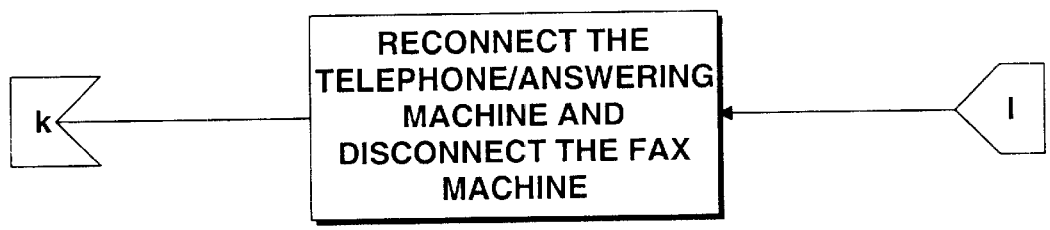
Figure 6F:
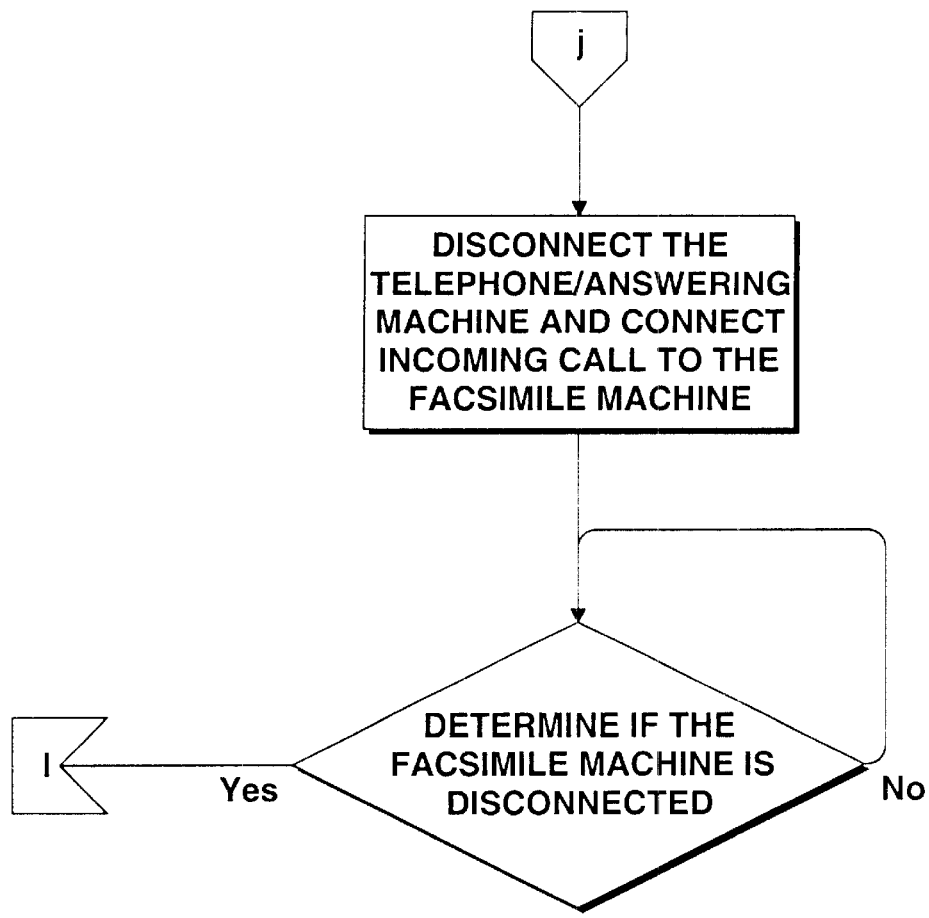
Figure 6G:
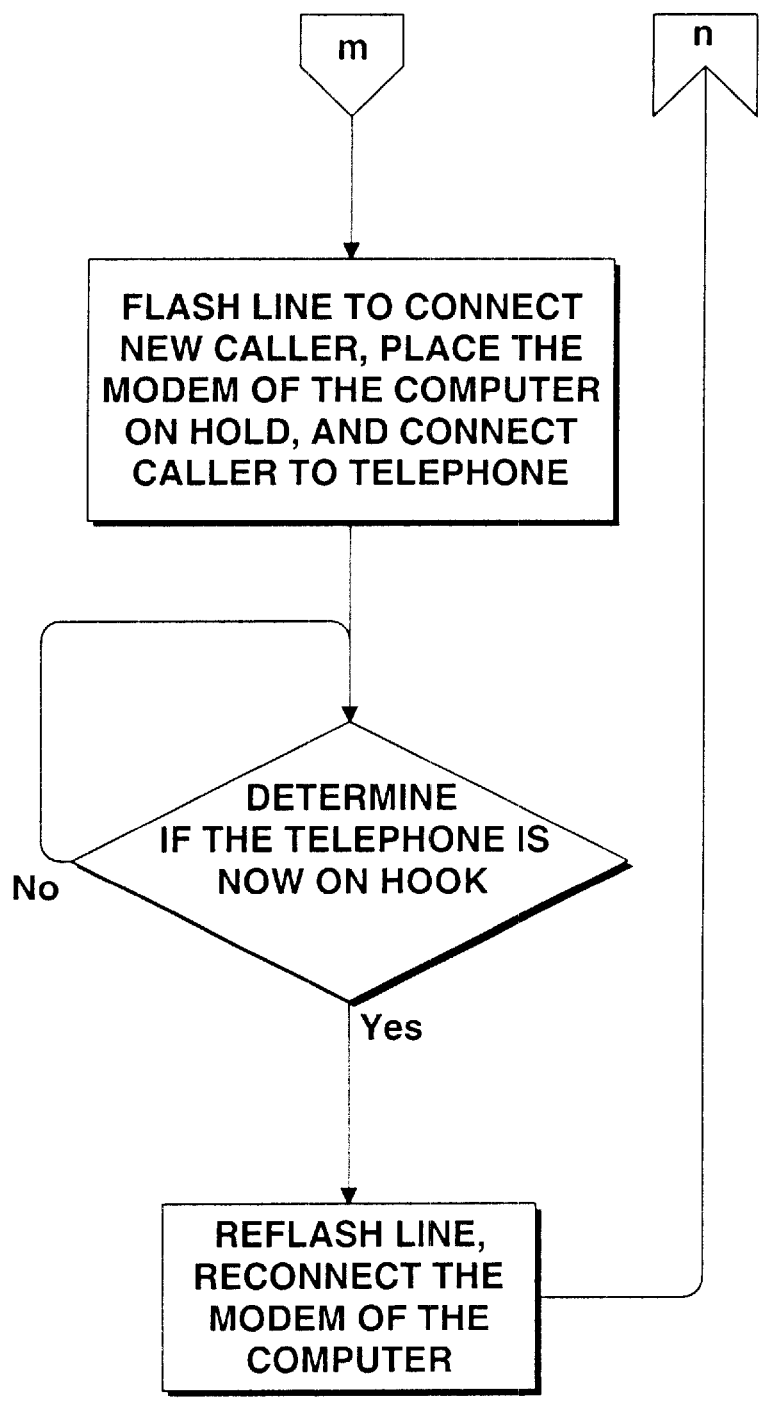
Figure 7A:
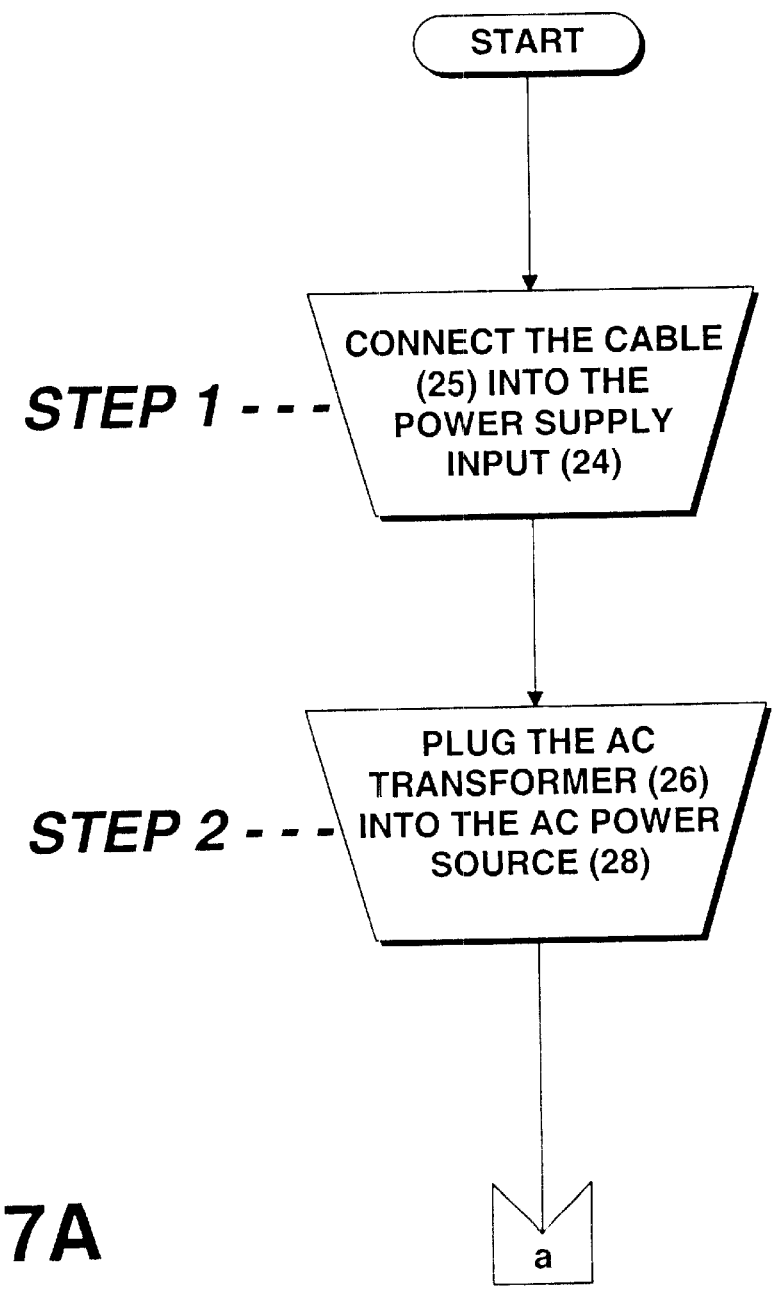
FIGS. 7A–7E is a flow chart of the method of installing the present invention.
Figure 7B:
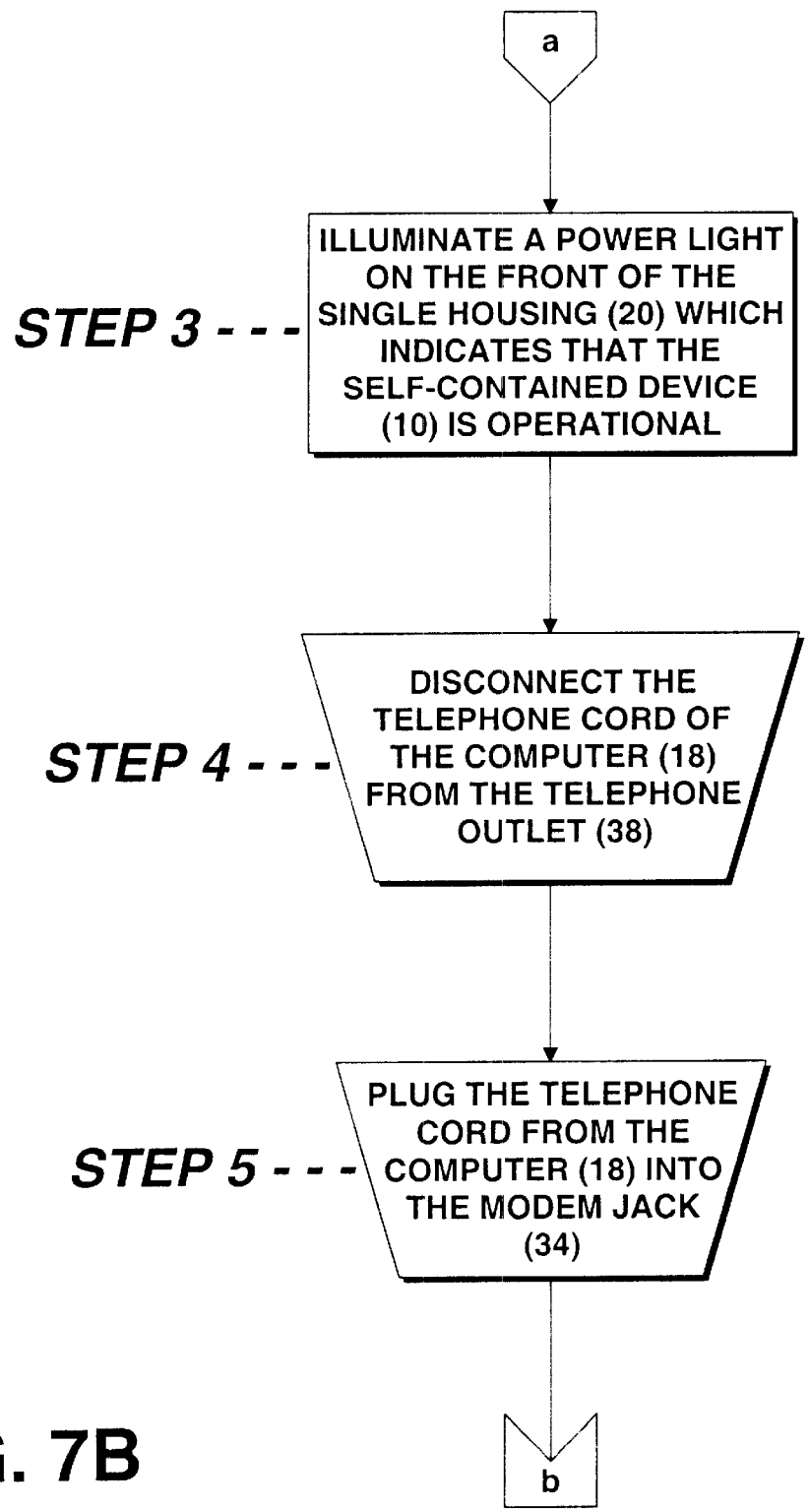
Figure 7C:
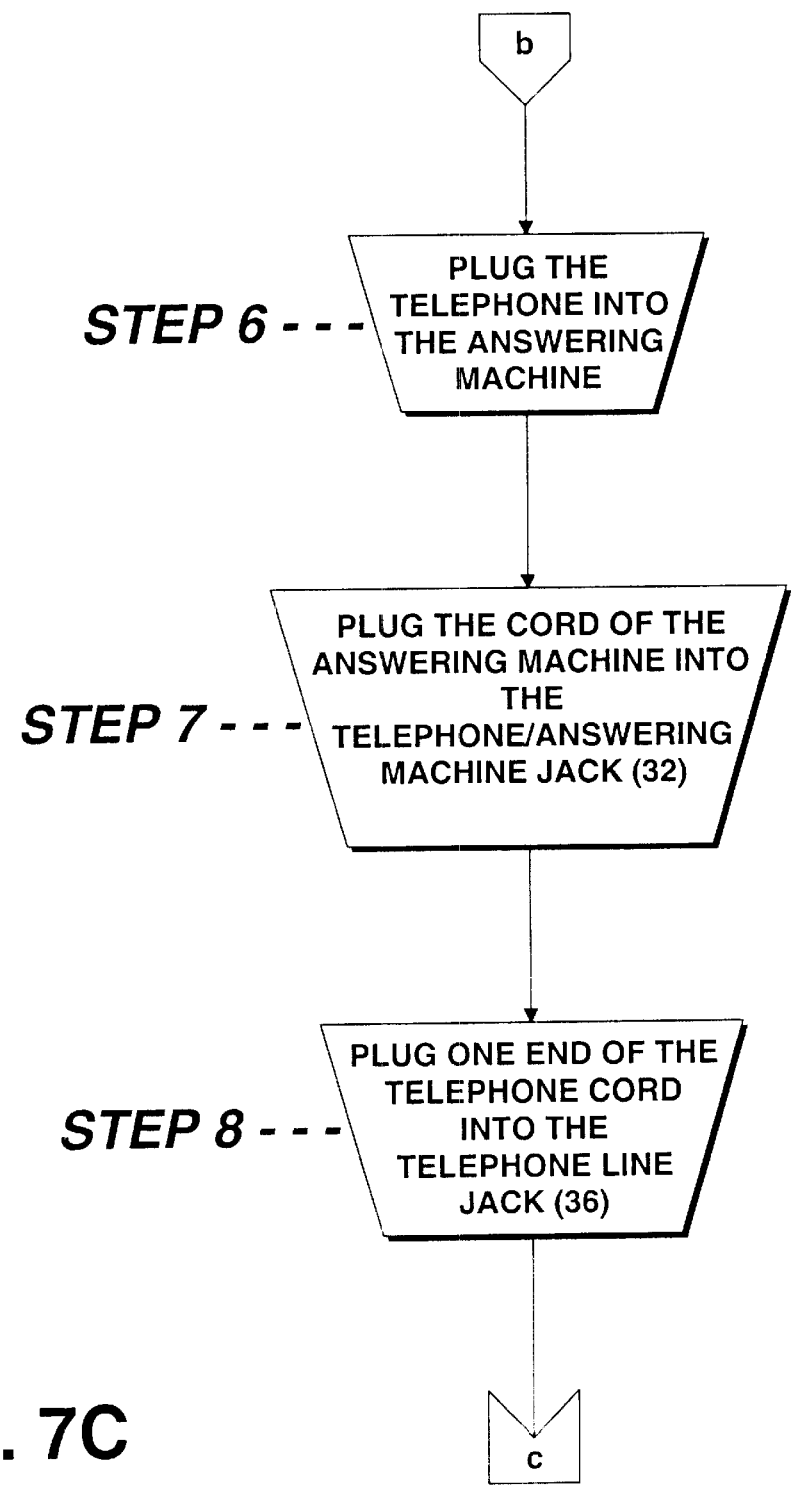
Figure 7D:
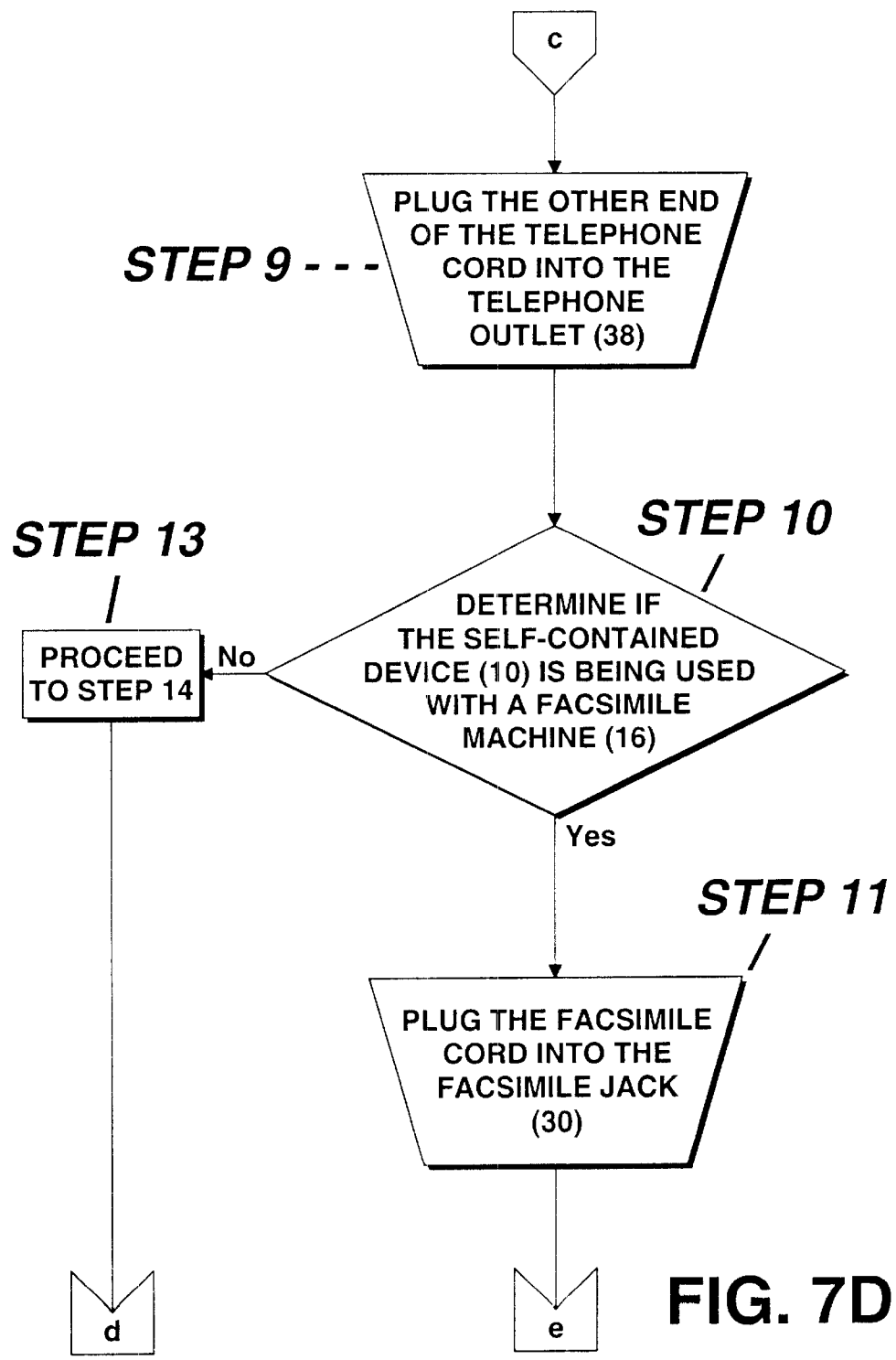
Figure 7E:
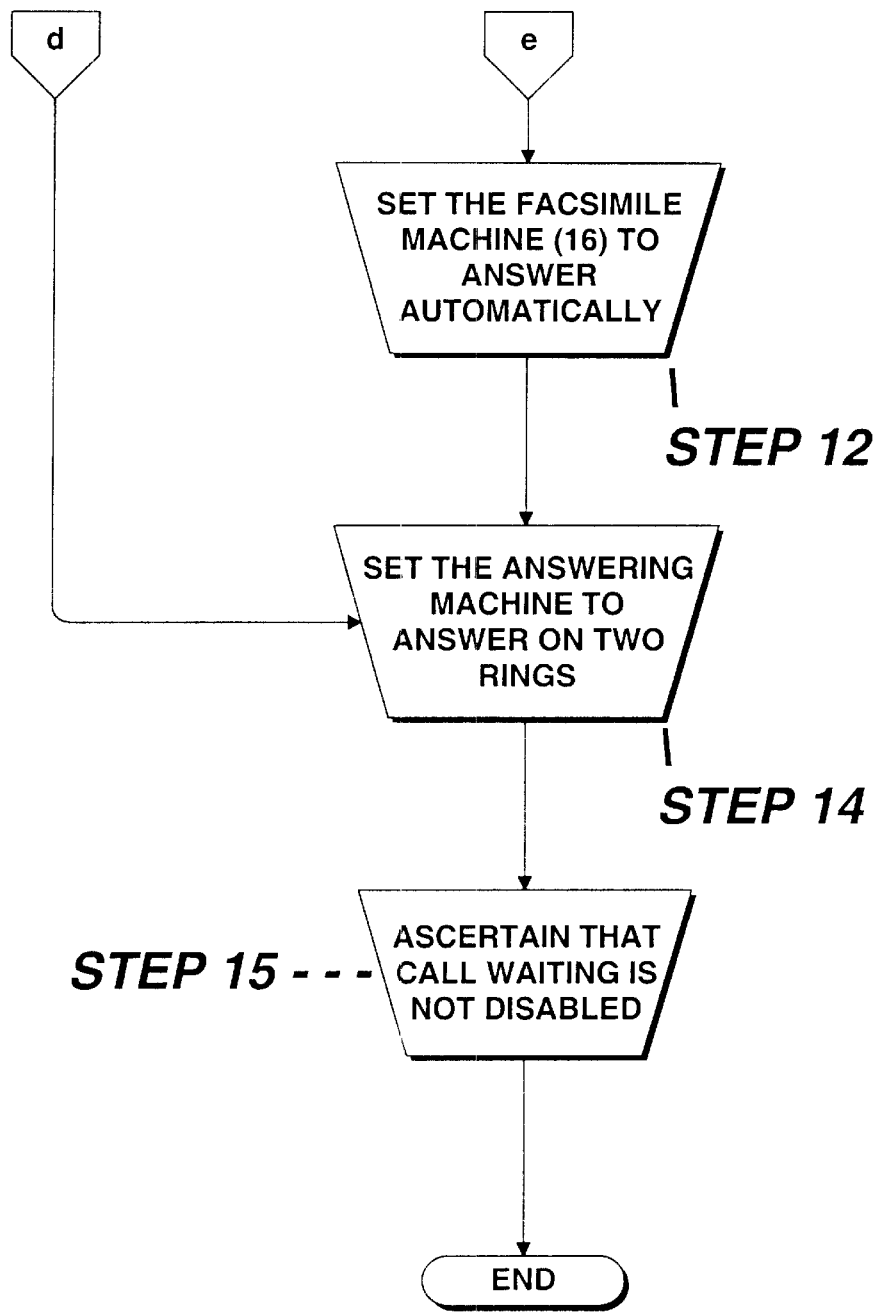

Referring now to the figures, in which like numerals indicate like parts, and particularly to FIGS. 1–3, the self-contained device of the present invention is shown generally at 10 for using a single telephone line 12 to receive telephone calls and facsimiles for transmission respectively to a telephone/answering machine 14 and a facsimile machine 16 while being simultaneously connectable to the Internet by a computer 18 that has a modem 19.

The self-contained device 10 comprises a single housing 20 that has a back wall 22.

The self-contained device 10 further comprises a power supply input 24. The power supply input 24 is on the back wall 22 on the single housing 20 and is connected by a cable 25 to an AC transformer 26 for connecting to an AC power source 28.

The self-contained device 10 further comprises a facsimile jack 30. The facsimile jack 30 is on the back wall 22 of the single housing 20 and is for connecting to the facsimile machine 16.

The self-contained device 10 further comprises a telephone/answering machine jack 32. The telephone/answering machine jack 32 is on the back wall 22 of the single housing 20 and is for connecting to the telephone/answering machine 14.

The self-contained device 10 further comprises a modem jack 34. The modem jack 34 is on the back wall 22 of the single housing 20 and is for connecting to the computer 18.

The self-contained device 10 further comprises a telephone line jack 36. The telephone line jack 36 is on the back wall 22 of the single housing 20 and is for connecting to a telephone outlet 38. If a caller ID device 40 is used, the caller ID device 40 is connected between the telephone line jack 36 and the telephone outlet 38.

The self-contained device 10 further comprises a power supply 41. The power supply 41 is contained in the single housing 20 and communicates with the power supply input 24. The power supply 41 includes a 5 volt voltage regulator 43.

The self-contained device 10 further comprises a micro-processor 42. The micro-processor 42 is contained in the single housing 20 and makes most of the functional decisions. A typical example of the micro-processor 42 is Microchip PIC 16C54.

The self-contained device 10 further comprises tone detectors 44. The tone detectors 44 are contained in the single housing 20, communicate with the micro-processor 42, and include a fax tone detector 44a and a call waiting tone detector 44b.

The fax tone detector 44a detects a fax tone when the self-contained device 10 is in a mode to detect the fax tone. A typical example of the fax tone detector 44a is LM567 (National Semiconductor) or NJM567 (New Japan Radio).

The call waiting tone detector 44b is a tone detector with switched capacitor or digital signal processing (DSP) detection that detects a call-waiting tone and also discriminates between the call-waiting tone and modem noise present at that time. The call waiting tone detector 44b has selectable frequencies for different tones in other countries. A typical example of the call waiting tone detector 44b is Teltone M982-02.

The self-contained device 10 further comprises telephone line isolation and input amplification and filtration 45. The telephone line isolation and input amplification and filtration 45 are contained in the single housing 20 and communicate with, and between, the tone detectors 44 and the telephone line jack 36.

The self-contained device 10 further comprises a tone select 46. The tone select 46 is contained in the single housing 20 and communicates with the tone detectors 44.

The self-contained device 10 further comprises a display and ring buzzer 48. The display and ring buzzer 48 are contained in the single housing 20 and communicate with the micro-processor 42. The micro-processor 42 generates tone for the display and ring buzzer 48.

The self-contained device 10 further comprises a ring voltage generator 50. The ring voltage generator 50 is contained in the single housing 20 and communicates with, and between, the display ring buzzer 48 and the facsimile jack 30.

The ring voltage generator 50 includes a subminiature step-up transformer 51. The subminiature step-up transformer 51, in conjunction with a transistor 53, a first diode 55, a second diode 57, a first capacitor 59, a second capacitor 61, and a resistor 63, amplify ring tone generated by the micro-processor 42 and place the micro-processor 42 on the telephone line 12 only when the telephone/answering machine 14 is off-hook and the facsimile tone detector 44a detects an appropriate tone for longer than 100 ms. A Typical example of the subminiature step-up transformer 51 is T1006 and a typical example of the transistor 53 is MPS222.

The self-contained device 10 further comprises a status detect (on/off hook) 52. The status detect (on/off hook) 52 is contained in the single housing 20 and communicates with the micro-processor 42.

The self-contained device 10 further comprises control relays 54. The control relays 54 are contained in the single housing 20 and communicate with the status detect (on/off hook) 52. The control relays 54 include a first control relay 65, a second control relay 67, a third control relay 69, and a fourth control relay 71.

The first control relay 65 is a double pole double throw (DPDT) telephone approved relay and has a normally closed relaxed position and an actuated position when a call waiting tone has been successfully detected. The first control relay 65, when in the relaxed position thereof, connects the computer 18 to the telephone line 12. The first control relay 65, when in the actuated position thereof, disconnects the computer 18 from the telephone line 12, and places a load to the telephone line 12 for a short time (about 300 ms) so that any call-waiting-ID device 40 which may be connected can "read" data of the telephone line 12 without being interfered with by noise from the modem 19 of the computer 18. A typical example of the first control relay 65 is AZ831.

The second control relay 67 is a DPDT telephone approved relay and has a normally closed relaxed position and an actuated position. The second control relay 67, when in the normally closed relaxed position thereof, connects the telephone line 12 to circuits of the self-contained device 10. The second control relay 67, when in the actuated position thereof, disconnects the telephone line 12 from all the circuits of the self-contained device 10. The second control relay 67 is used as a flash relay, which is actuated by the micro-processor 42 when a flash is required to place the internet service provider (ISP) on hold and connect a new caller to a user. A typical example of the second control relay 67 is AZ831.

The third control relay 69 is a DPDT telephone relay and has a normally closed relaxed position and an actuated position. The third control relay 69, when in the normally closed relaxed position thereof, disconnects the facsimile machine 16 from the telephone line 12. The third control relay 69, when in the actuated position thereof, connects the facsimile machine 16 to the telephone line 12. A typical example of the third control relay 69 is AZ831.

The fourth control relay 71 is a DPDT telephone approved relay and has a normally closed relaxed position and an actuated position. The fourth control relay 71, when in the normally closed relaxed position thereof, connects the computer 18 to the telephone line 12. The fourth control relay 71, when in the actuated position thereof, disconnects the computer 18 from the telephone line 12 and places the computer 18 on hold, by applying ground and voltage to the modem 19 of the computer 18, causing the modem 19 of the computer 18 to remain connected. Without the fourth control relay 71, the computer 18 would detect no on-line state and quickly disconnect the fourth control relay 71 extending wait time of the computer 18 for the user to finish talking when a call is received. A typical example of the fourth control relay 71 is AZ831.

The control relays 54 further include a first optoisolator 62, a second optoisolator 64, a third optoisolator 66, and a fourth optoisolator 68 that are designed to interface between the micro-processor 42 and the telephone line 12 preventing a flow of line voltage to the micro-processor 42.

The first optoisolator 62 detects fax machine off-hook and reports it to the micro-processor 42 as a state. The second optoisolator 64 disconnects load from the telephone line 12 when the telephone/answering machine 14 is used reducing loading of the telephone line 12. The third optoisolator 66 detects the modem 19 in the computer 18 off hook and reports it to the micro-processor 42. The fourth optoisolator 68 detects telephone off hook and reports it to the micro-processor 42. Any generic optoisolator may be used, a typical example being IDL620.

The line jack 36, the modem jack 34, the telephone/answering machine jack 32, and the facsimile jack 30, each communicate with the control relays 54.

The self-contained device 10 further comprises output drivers 56. The output drivers 56 are contained in the single housing 20 and communicate with the micro-processor 42. The output drivers 56 include a transistor array chip 60 that contains 7 transistors which saves board space by combining the 7 transistors and their base limit resistors in one small footprint. A Typical example of the transistor array chip 60 is ULN2003.

The self-contained device 10 further comprises an operational amplifier 58 that has impedance. The operational amplifier 58 communicates with, and between, the fax tone detector 44a and the call waiting tone detector 44b. The operational amplifier 58 functions as an interface with the telephone line 12 and matches the impedance of the operational amplifier 58 with the telephone line 12. Also, the operational amplifier is designed to amplify frequencies of call waiting tone and facsimile tone. In addition, the operational amplifier 58 filters out unwanted tones to reduce possibility of false detection. A typical example of the operational amplifier 58 is the 741 single gate device.

The method of operation of the self-contained device 10 can best be seen in FIGS. 4A–4D, and a such, will be discussed with reference thereto.

STEP 1: Ascertain that the self-contained device 10 is connected to the AC power source 28 by illumination of a power light on the front of the single housing 20.

STEP 2: Log online.

STEP 3: Ascertain that the computer 18 is online by illumination of a modem light on the front of the single housing 20.

STEP 4: Ring and flash a call light when the self-contained device 10 detects a call waiting signal.

STEP 5: Determine if call is to be answered.

STEP 6: Lift the handset of the telephone connected to the self-contained device 10, if answer to STEP 5 is yes.

STEP 7: Flash automatically the telephone line 12 and connect to the caller, placing automatically the Internet provider on hold.

STEP 8: Hang up the telephone once finished with the call.

STEP 9: Reflash automatically the telephone line 12 and connect the computer 18 back to the Internet provider.

STEP 10: Determine if the service provider has logged off the computer 18. It is not unusual for the Internet service provider to disconnect within a short period.

STEP 11: Reconnect, if answer to STEP 10 is yes.

The method of operation of the self-contained device 10 when used with the facsimile machine 16 can best be seen in FIGS. 5A–5B and 6A–6G, and as such, will be discussed with reference thereto.

STEP 1: Listen for a fax tone any time there is an incoming call regardless if the incoming call is answered by either picking up the telephone, the answering machine, or in a call waiting call.

STEP 2: Determine if the incoming call is a voice.

STEP 3: Ignore the incoming call, if answer to STEP 2 is yes.

STEP 4: Determine if the incoming call is a fax, if answer to STEP 2 is no.

STEP 5: Ring immediately the facsimile machine 16, if answer to STEP 4 is yes.

STEP 6: Transfer the incoming call to the facsimile machine 16, if STEP 5 is carried out.

The method of installing the self-contained device 10 can best be seen in FIGS. 7A–7E, and as such, will be discussed with reference thereto.

STEP 1: Connect the cable 25 into the power supply input 24.

STEP 2: Plug the AC transformer 26 into the AC power source 28.

STEP 3: Illuminate a power light on the front of the single housing 20, which indicates that the self-contained device 10 is operational.

STEP 4: Disconnect the telephone cord of the computer 18 from the telephone outlet 38.

STEP 5: Plug the telephone cord from the computer 18 into the modem jack 34.

STEP 6: Plug the telephone into the answering machine.

STEP 7: Plug the cord of the answering machine into the telephone/answering machine jack 32.

STEP 8: Plug one end of the telephone cord into the telephone line jack 38.

STEP 9: Plug the other end of the telephone cord into the telephone outlet 38.

STEP 10: Determine if the self-contained device 10 is being used with a facsimile machine 16.

STEP 11: Plug the facsimile cord into the facsimile jack 30, if answer to STEP 10 is yes.

STEP 12: Set the facsimile machine 16 to answer automatically and proceed to STEP 14, if STEP 11 is carried out. The facsimile machine 16 will only respond to an incoming call when the self-contained device 10 transfers the incoming call to the facsimile machine 16. The facsimile machine 16 will no longer answer when the telephone rings.

STEP 13: Proceed to step 14, if answer to STEP 10 is no.

STEP 14: Set the answering machine to answer on two rings.

STEP 15: Ascertain that call waiting is not disabled.

Figure 8A:
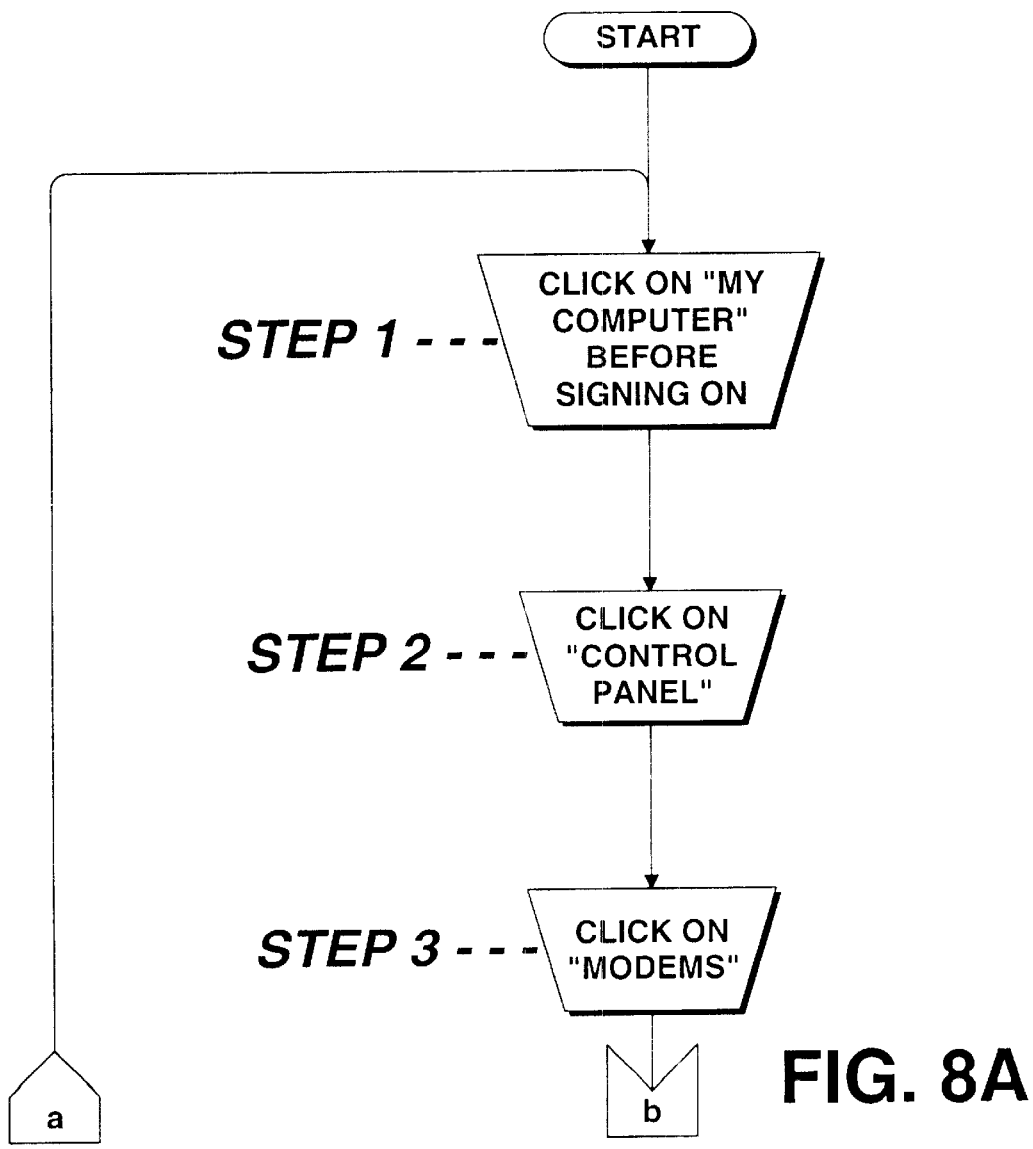
FIGS. 8A–8C is a flow chart of the method of ascertaining that call waiting is not disabled for window users.
Figure 8B:
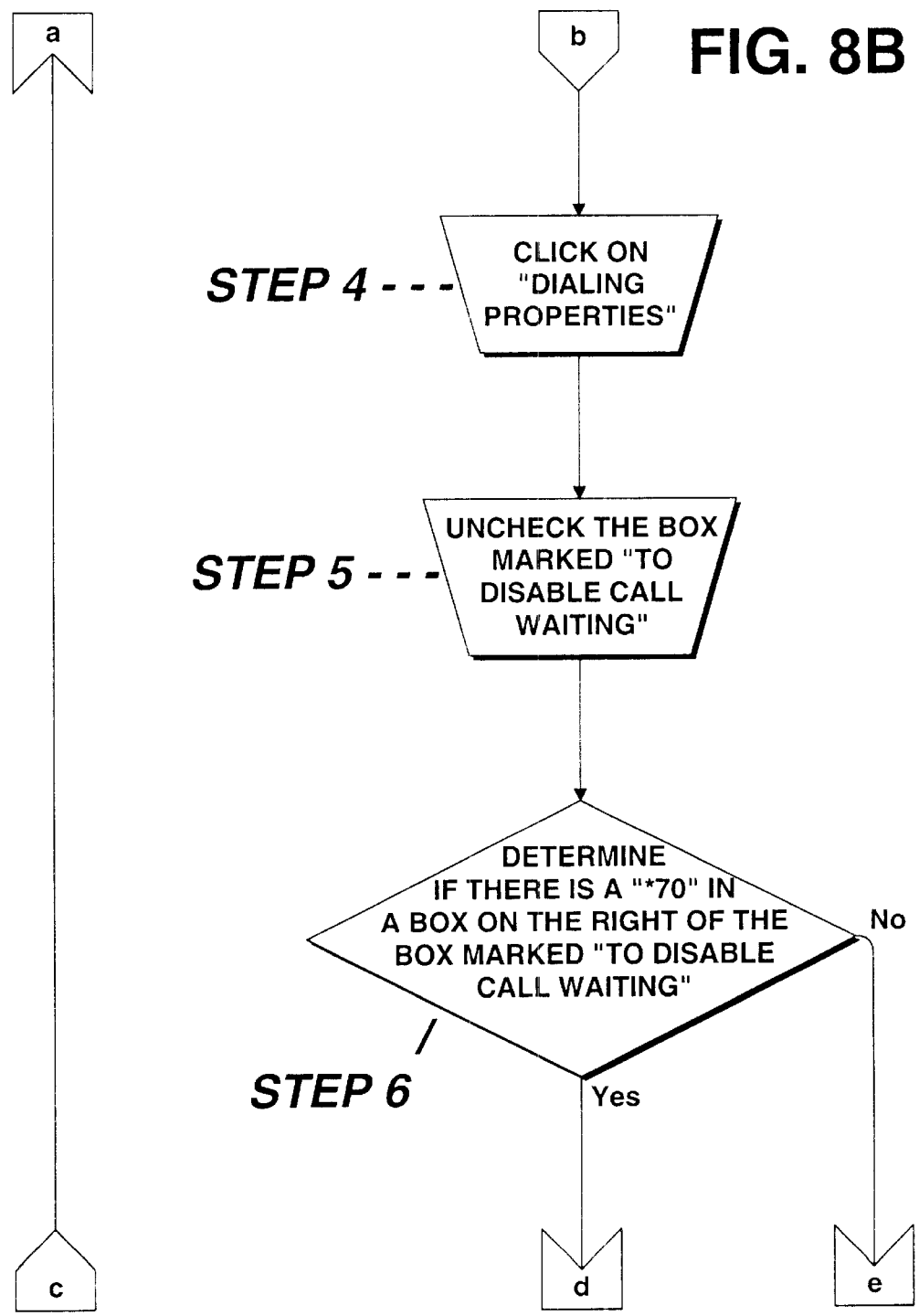
Figure 8C:
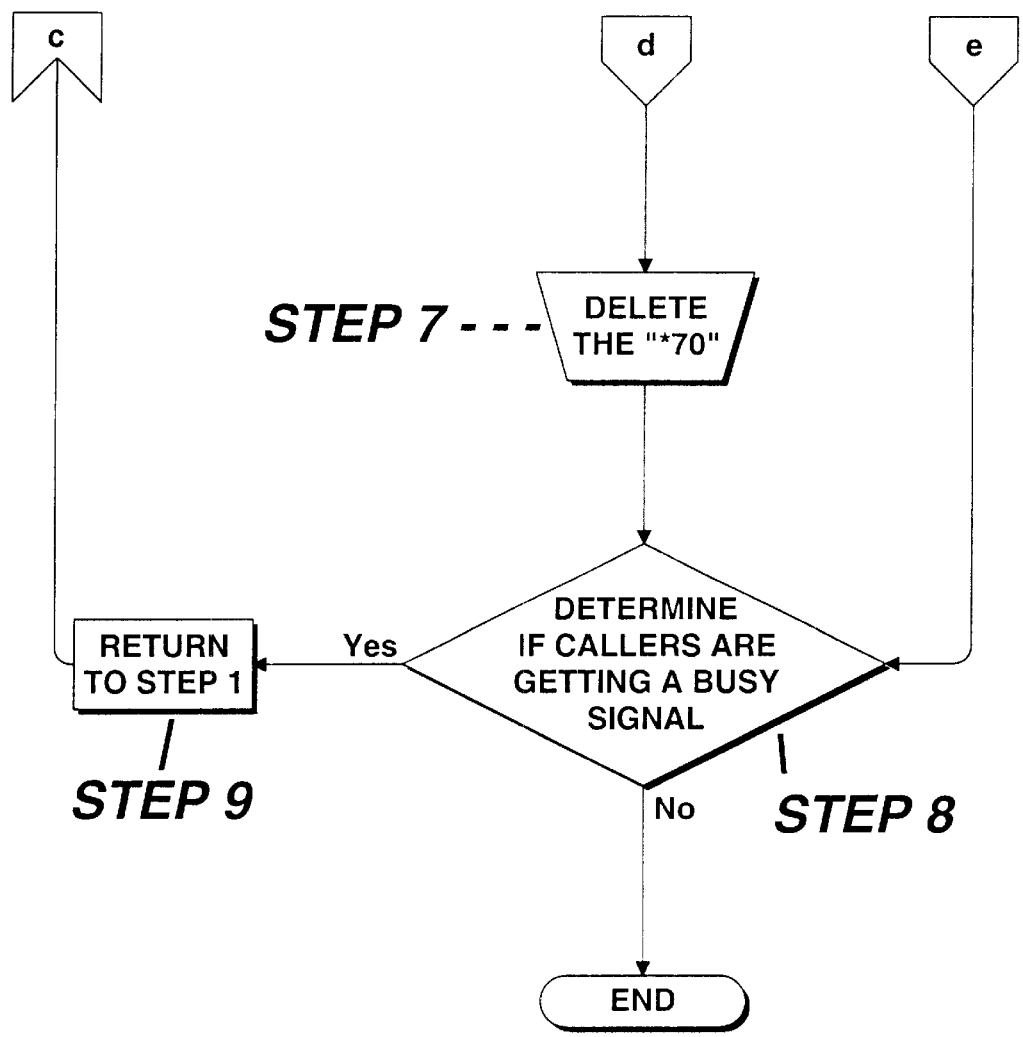

The method of ascertaining that call waiting is not disabled for window users can best be seen in FIGS. 8A–8C, and as such, will be discussed with reference thereto.

STEP 1: Click on "my computer" before signing on.

STEP 2: Click on "control panel".

STEP 3: Click on "modems".

STEP 4: Click on "dialing properties".

STEP 5: Uncheck the box marked "to disable call waiting".

STEP 6: Determine if there is a "*70" in a box on the right of the box marked "to disable call waiting".

STEP 7: Delete the "*70", if answer to STEP 6 is yes. There may also be a telephone icon on the control panel with the same check box.

STEP 8: Determine if callers are getting a busy signal.

STEP 9: Return to STEP 1, if answer to STEP 8 is yes.

Figure 9A:
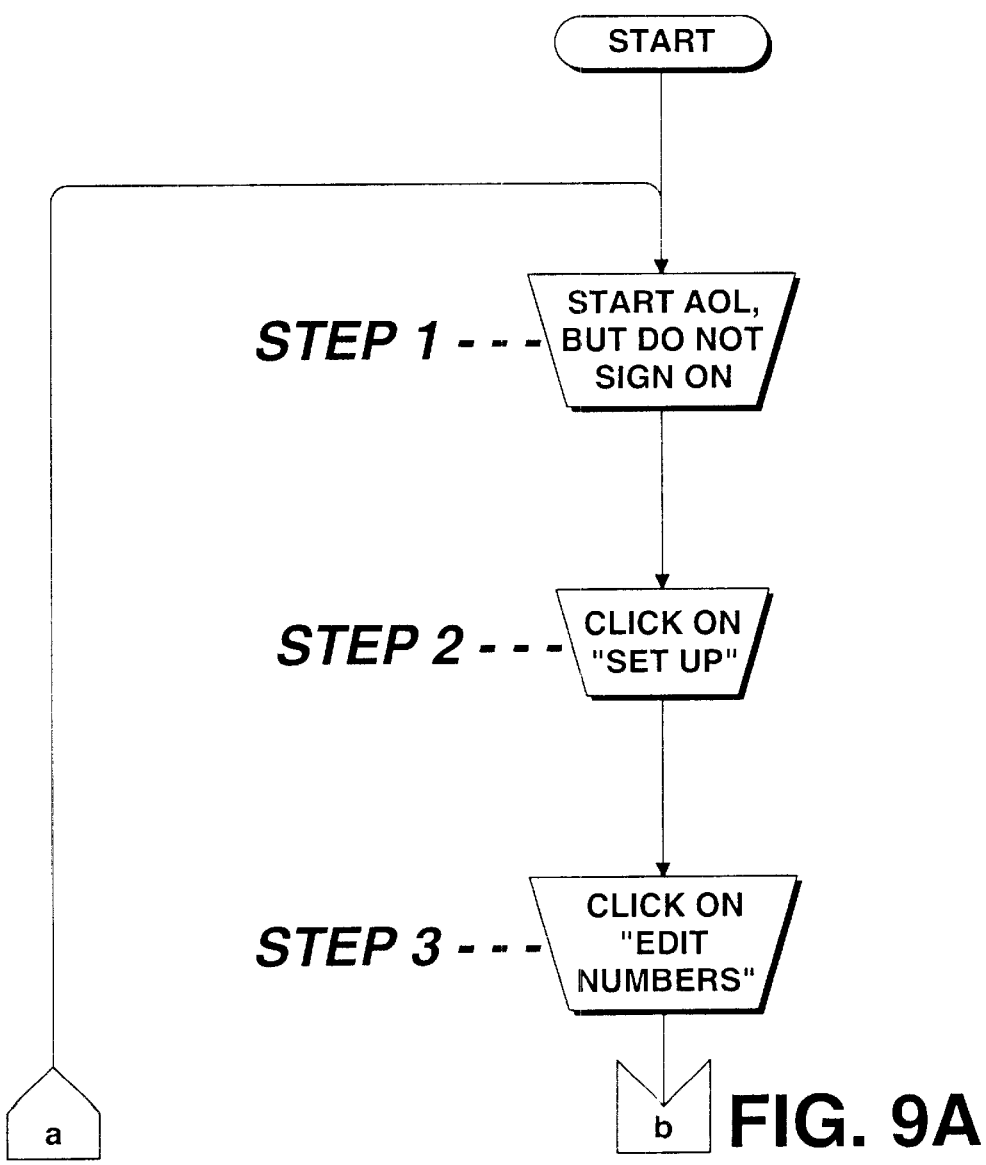
FIGS. 9A–9B is a flow chart of the method of ascertaining that calling waiting is not disabled for America-On-Line (AOL) users.
Figure 9B:
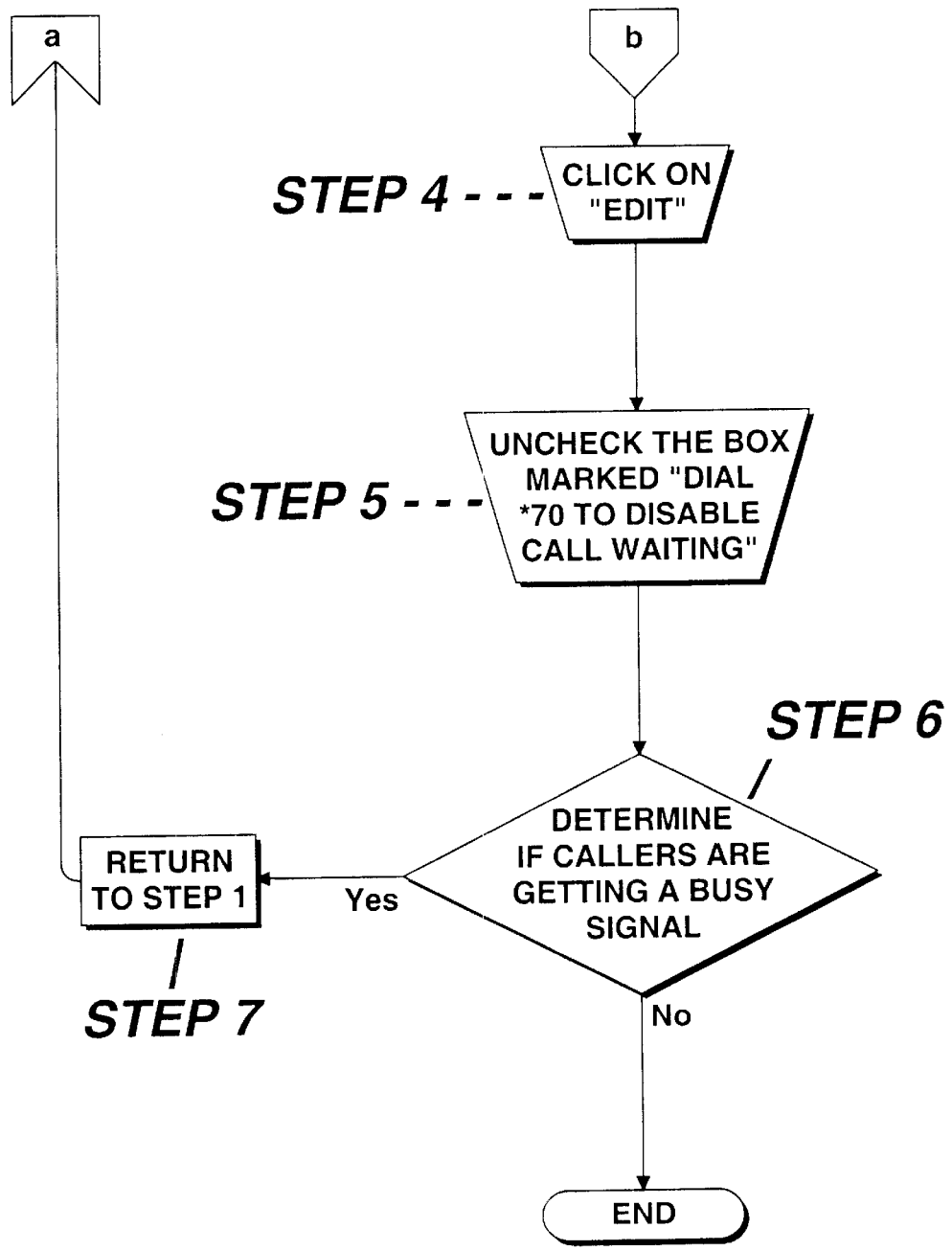

The method of ascertaining that calling waiting is not disabled for AOL users can best be seen in FIGS. 9A–9B, and as such, will be discussed with reference thereto.

STEP 1: Start AOL, but do not sign on.

STEP 2: Click on "set up".

STEP 3: Click on "edit numbers".

STEP 4: Click on "edit".

STEP 5: Uncheck the box marked "dial *70 to disable call waiting".

STEP 6: Determine if callers are getting a busy signal.

STEP 7: Return to STEP 1, if answer to STEP 6 is yes.

Figure 10A:
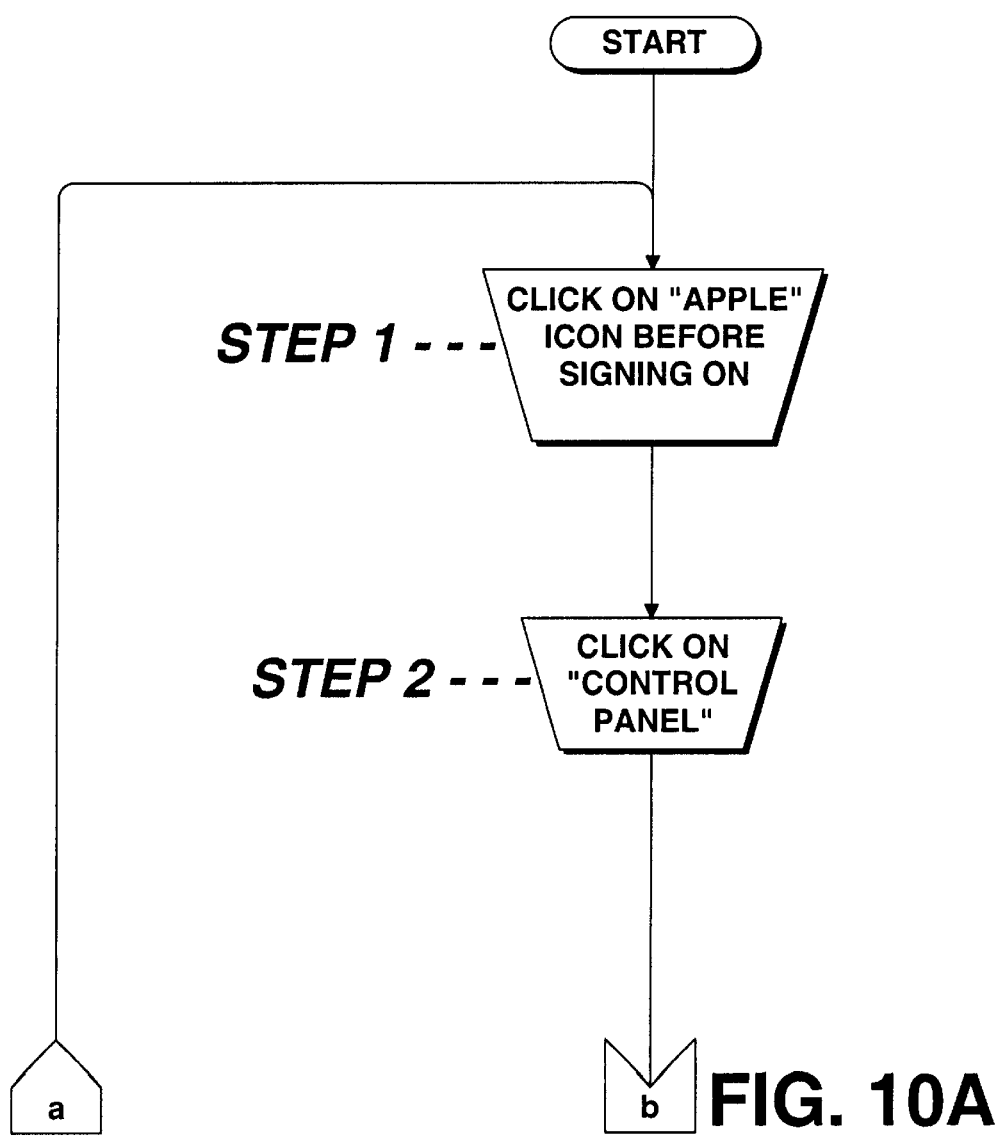
FIGS. 10A–10B is a flow chart of the method for ascertaining that call waiting is not disabled for Macintosh Computer (MAC) users.
Figure 10B:
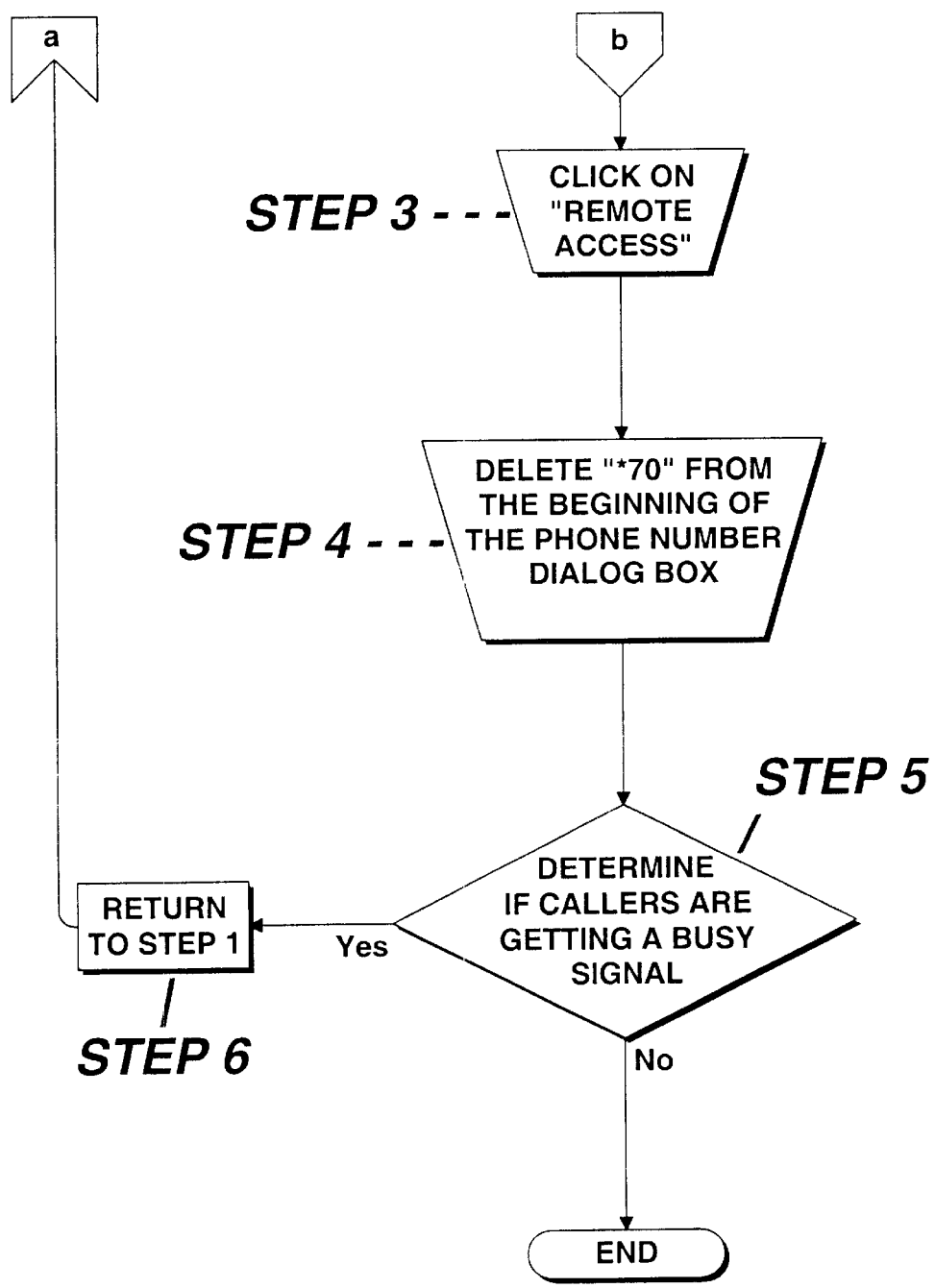
Figure 11A:
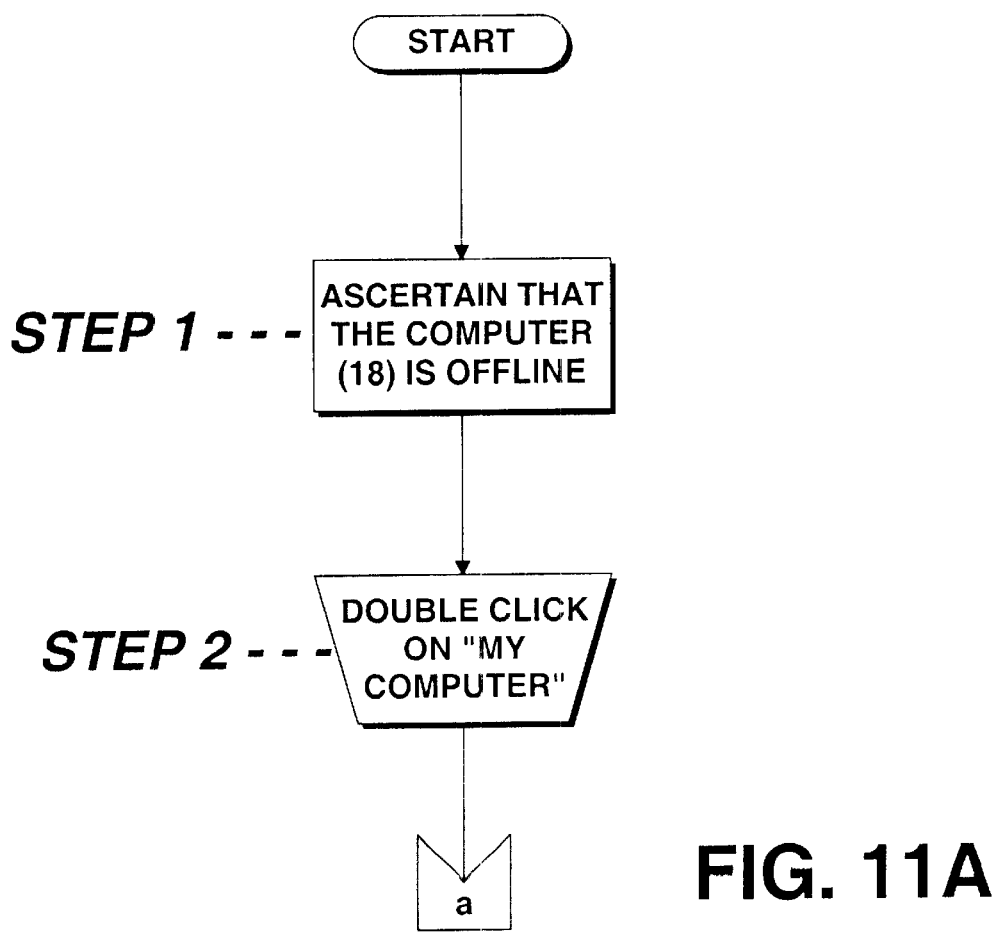
Figure 11B:
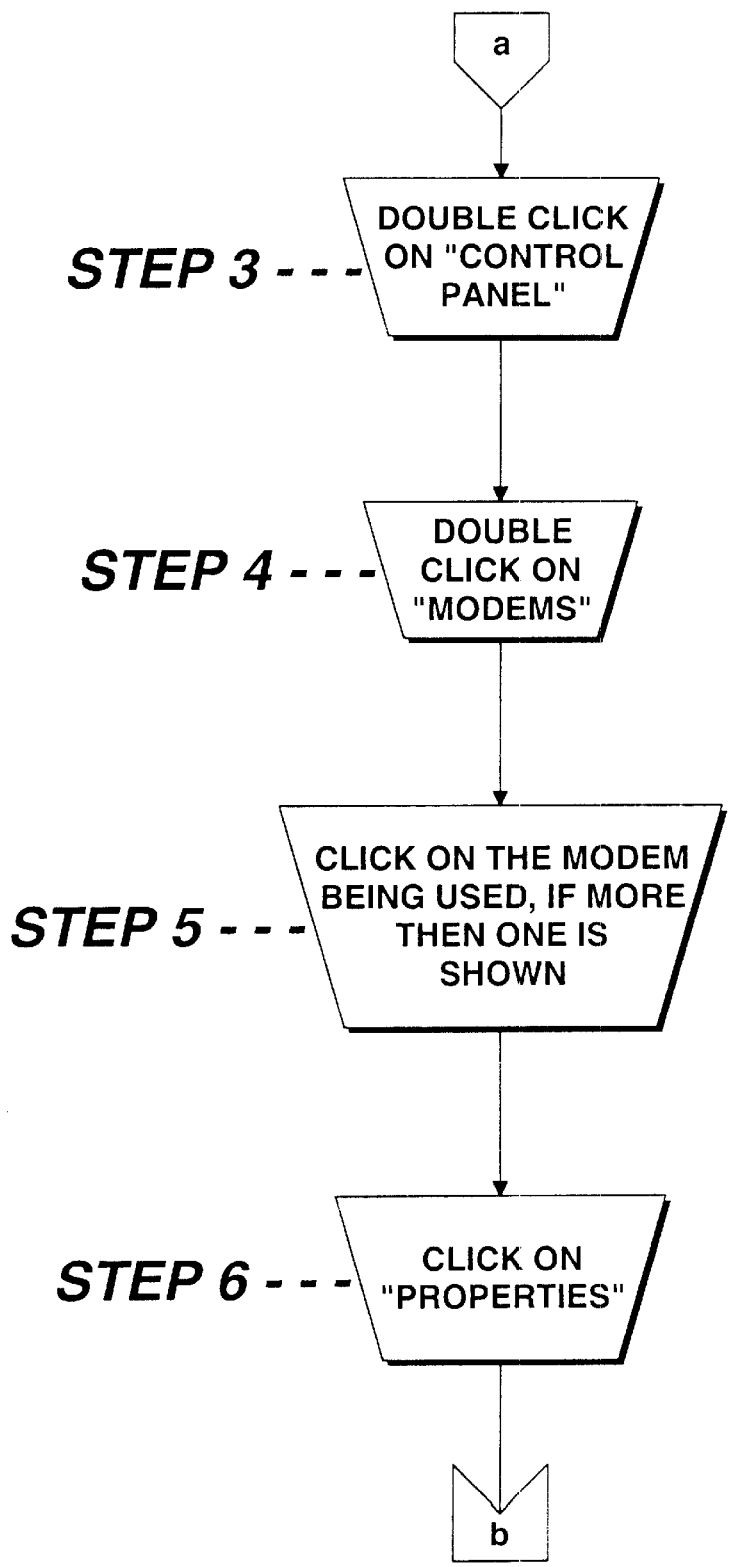
Figure 11D:
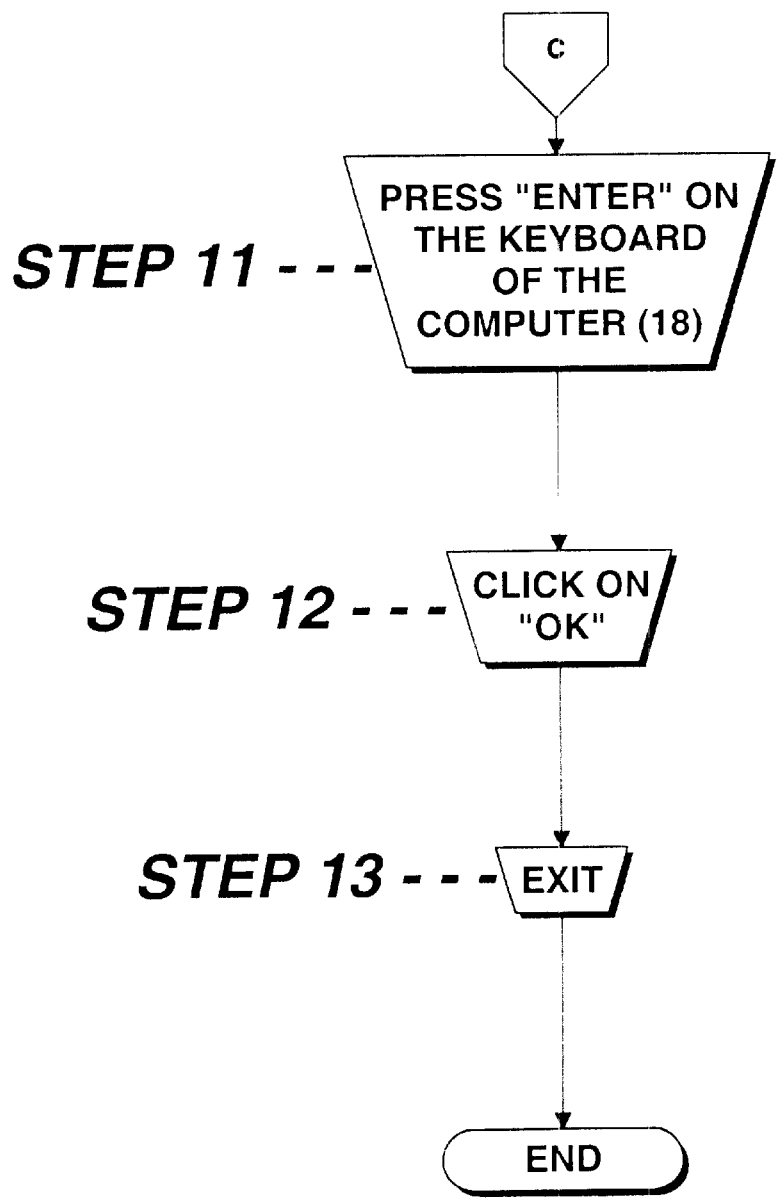

The method for ascertaining that call waiting is not disabled for MAC users can best be seen in FIGS. 10A–10B, and as such, will be discussed with reference thereto.

STEP 1: Click on the apple icon before signing on.
STEP 2: Click on "control panel".
STEP 3: Click on "remote access".
STEP 4: Delete "*70" from the beginning of the phone number dialog box.
STEP 5: Determine if callers are getting a busy signal.
STEP 6: Return to STEP 1, if answer to STEP 5 is yes.

The method of making the self-contained device 10 work better with the computer 18 if the computer 18 disconnects as soon as the telephone/answering machine 14 rings or as soon as the telephone/answering machine 14 is answered can best be seen in FIGS. 11A–11D, and as such, will be discussed with reference thereto.

STEP 1: Ascertain that the computer 18 is offline.
STEP 2: Double click on "my computer".
STEP 3: Double click on "control panel".
STEP 4: Double click on "modems".
STEP 5: Click on the modem being used, if more than one is shown.
STEP 6: Click on "properties".
STEP 7: Click on "connection".
STEP 8: Click on "advanced".
STEP 9: Click on "extra settings" window.
STEP 10: Type "S10 255" so as to set the modems S10 register to 255 so that the S10 register tells the computer 18 to wait on hold while the telephone/answering machine 14 is picked up.
STEP 11: Press "enter" on the keyboard of the computer 18.
STEP 12: Click on "OK".
STEP 13: Exit.

It will be understood that each of the elements described above, or two or more together, may also find a useful application in other types of constructions differing from the types described above.

While the invention has been illustrated and described as embodied in a self-contained device for using a single telephone line to receive telephone calls and facsimiles while being simultaneously connectable to the Internet, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A self-contained device for using a single telephone line to receive telephone calls and facsimiles for transmission respectively to a telephone/answering machine and a facsimile machine while being simultaneously connectable to the Internet by a computer having a modem, said device comprising:
   a) a single housing;
   b) a facsimile jack;
   c) a telephone/answering machine jack;
   d) a modem jack;
   e) a telephone line jack; and
   f) a microprocessor;
   wherein said single housing has a wall;
   wherein said facsimile jack is on the wall of the single housing;
   wherein said facsimile jack is for connecting to the facsimile machine;
   wherein said telephone/answering machine jack is on the wall of the single housing;
   wherein said telephone/answering machine jack is for connecting to the telephone/answering machine;
   wherein said modem jack is on the wall of the single housing;
   wherein said modem jack is for connecting to the computer;
   wherein said telephone line jack is on the wall of the single housing;
   wherein said telephone line jack is for connecting to a telephone outlet;
   wherein said micro-processor is contained in said single housing;
   wherein said micro-processor makes most of the functional decisions;
   wherein said control relays include a first control relay;
   wherein said control relays include a second control relay;
   wherein said control relays include a third control relay;
   wherein said control relays include a fourth control relay;
   wherein said first control relay is a DPDT telephone approved relay;
   wherein said first control relay has a normally closed relaxed position;
   wherein said first control relay has an actuated position when a call waiting tone has been successfully detected;
   wherein said first control relay, when in said relaxed position thereof, connects the computer to the telephone line;
   wherein said first control relay, when in said actuated position thereof, disconnects the computer from the telephone line and places a load to the telephone line for a short time so that any call-waiting-ID device which may be connected can read data of the telephone line without being interfered with by noise from the modem of the computer;
   wherein said fourth control relay is a DPDT telephone approved relay;
   wherein said fourth control relay has a normally closed relaxed position;
   wherein said fourth control relay has an actuated position
   wherein said fourth control relay, when in said normally closed relaxed position thereof, connects the computer to the telephone line; and
   wherein said fourth control relay, when in said actuated position thereof, disconnects the computer from the telephone line and places the computer on hold by applying ground and voltage to the modem of the computer causing the modem of the computer to remain connected, and without said fourth control relay, the computer would detect no on-line state and quickly disconnect said fourth control relay extending wait time of the computer for a user to finish talking when a call is received.

2. The device as defined in claim 1; further comprising a power supply input;
   wherein said power supply input is on said wall of said single housing;
   wherein said power supply input is connected by a cable to an AC transformer; and wherein said AC transformer is for connecting to an AC power source.

3. The device as defined in claim 2; further comprising a power supply;
   wherein said power supply is contained in said single housing;
   wherein said power supply communicates with said power supply input; and
   wherein said power supply includes a 5 volt voltage regulator.

4. The device as defined in claim 1; further comprising tone detectors;
   wherein said tone detectors are contained in said single housing;
   wherein said tone detectors communicate with said micro-processor;
   wherein said tone detectors include a fax tone detector;
   wherein said fax tone detector detects a fax tone when said self-contained device is in a mode to detect the fax tone;
   wherein said tone detectors include a call waiting tone detector;
   wherein said call waiting tone detector detects a call-waiting tone;
   wherein said call waiting tone detector discriminates between the call-waiting tone and modem noise present at that time;
   wherein said call waiting tone detector has selectable frequencies for different tones in other countries; and
   wherein said call waiting tone detector is a tone detector with switched capacitor or DSP detection.

5. The device as defined in claim 4, further comprising an operational amplifier;
   wherein said operational amplifier has impedance;
   wherein said operational amplifier communicates with, and between, said fax tone detector and said call waiting tone detector;
   wherein said operational amplifier functions as an interface with the telephone line and matches said impedance of said operational amplifier with the telephone line;
   wherein said operational amplifier is designed to amplify frequencies of a call waiting tone and a facsimile tone;
   wherein said operational amplifier filters out unwanted tones to reduce possibility of false detection; and
   wherein said operational amplifier is a single gate device.

6. The device as defined in claim 4; further comprising telephone line isolation and input amplification and filtration;
   wherein said telephone line isolation and input amplification and filtration are contained in said single housing; and
   wherein said telephone line isolation and input amplification and filtration communicate with, and between, said tone detectors and said telephone line jack.

7. The device as defined in claim 6; further comprising a tone select;
   wherein said tone select is contained in said single housing; and
   wherein said tone select communicates with said tone detectors.

8. The device as defined in claim 1; further comprising a display and ring buzzer;
   wherein said display and ring buzzer are contained in said single housing;
   wherein said display and ring buzzer communicate with said micro-processor; and
   wherein said micro-processor generates tone for said display and ring buzzer.

9. The device as defined in claim 8; further comprising a ring voltage generator;
   wherein said ring voltage generator is contained in said single housing;
   wherein said ring voltage generator communicates with, and between, said display ring buzzer and said facsimile jack;
   wherein said ring voltage generator includes a subminiature step-up transformer; and
   wherein said subminiature step-up transformer, in conjunction with a transistor, a first diode, a second diode, a first capacitor, a second capacitor, and a resistor, amplify ring tone generated by said micro-processor and place said micro-processor on the telephone line only when the telephone/answering machine is off-hook and said facsimile tone detector detects an appropriate tone for longer than 100 ms.

10. The device as defined in claim 1; further comprising a status detect (on/off hook);
    wherein said status detect (on/off hook) is contained in said single housing; and
    wherein said status detect (on/off hook) communicates with said micro-processor.

11. The device as defined in claim 10; further comprising control relays;
    wherein said control relays are contained in said single housing; and
    wherein said control relays communicate with said status detect (on/off hook).

12. The device as defined in claim 11, wherein said line jack communicates with said control relays;
    wherein said modem jack communicates with said control relays;
    wherein said telephone/answering machine jack communicates with said control relays; and
    wherein said facsimile jack communicates with said control relays.

13. The device as defined in claim 11, wherein said control relays include a first optoisolator;
    wherein said control relays include a second optoisolator;
    wherein said control relays include a third optoisolator;
    wherein said control relays include a fourth optoisolator;
    wherein said first optoisolator, said second optoisolator, said third optoisolator, and said fourth optoisolator are designed to interface between said micro-processor and the telephone line preventing a flow of line voltage to said micro-processor;
    wherein said first optoisolator detects fax machine off-hook and reports it to said micro-processor as a state;
    wherein said second optoisolator disconnects load from the telephone line when the telephone/answering machine is used reducing loading of the telephone line;
    wherein said third optoisolator detects the modem in the computer off hook and reports it to said micro-processor; and wherein said fourth optoisolator detect telephone off hook and reports it to said micro-processor.

14. The device as defined in claim 1; further comprising output drivers;
wherein said output drivers are contained in said single housing;
wherein said output drivers communicate with said microprocessor; wherein said output drivers include a transistor array chip; and
wherein said transistor array chip contains 7 transistors which saves board space by combining said 7 transistors and their base limit resistors in one small footprint.

15. The device as defined in claim 1,
wherein said third control relay is a DPDT telephone relay;
wherein said third control relay has a normally closed relaxed position;
wherein said third control relay has an actuated position;
wherein said third control relay, when in said normally closed relaxed position thereof, disconnects the facsimile machine from the telephone line; and
wherein said third control relay, when in said actuated position thereof, connects the facsimile machine to the telephone line.

16. The device as defined in claim 1,
wherein said second control relay is a DPDT telephone approved relay;
wherein said second control relay has a normally closed relaxed position;
wherein said second control relay has an actuated position;
wherein said second control relay, when in said normally closed relaxed position thereof, connects the telephone line to circuits of said self-contained device;
wherein said second control relay, when in said actuated position thereof, disconnects the telephone line from all said circuits of said self-contained device; and
wherein said second control relay is used as a flash relay, which is actuated by the micro-processor when a flash is required to place the ISP on hold and connect a new caller to a user.

* * * * *